(12) United States Patent  (10) Patent No.: US 9,231,389 B2
Batchelor  (45) Date of Patent: Jan. 5, 2016

(54) ELECTRICAL BOX, INTEGRATED FLANGE AND COVER MECHANISMS

(71) Applicant: Thomas M. Batchelor, Oakton, VA (US)

(72) Inventor: Thomas M. Batchelor, Oakton, VA (US)

(*) Notice: Subject to any disclaimer, the term of this patent is extended or adjusted under 35 U.S.C. 154(b) by 0 days.

(21) Appl. No.: 14/549,061

(22) Filed: Nov. 20, 2014

(65) Prior Publication Data

US 2015/0129298 A1  May 14, 2015

Related U.S. Application Data

(63) Continuation of application No. 13/583,048, filed as application No. PCT/US2011/027502 on Mar. 8, 2011, now Pat. No. 8,893,910.

(60) Provisional application No. 61/311,588, filed on Mar. 8, 2010, provisional application No. 61/431,961, filed on Jan. 12, 2011.

(51) Int. Cl.
| H02G 3/08 | (2006.01) |
| H02G 3/12 | (2006.01) |
| H02G 3/14 | (2006.01) |

(52) U.S. Cl.
CPC .............. *H02G 3/081* (2013.01); *H02G 3/123* (2013.01); *H02G 3/14* (2013.01)

(58) Field of Classification Search
USPC .......................................... 220/3.8, 825, 242
See application file for complete search history.

(56) References Cited

U.S. PATENT DOCUMENTS

| 4,992,627 A | 2/1991 | Mullaney |
| 5,148,348 A | 9/1992 | White |
| 5,317,108 A | 5/1994 | Prairie, Jr. |
| 6,456,255 B1 | 9/2002 | Lundahl |
| 6,737,576 B1 | 5/2004 | Dinh |
| 6,956,171 B1 | 10/2005 | Gretz |

(Continued)

FOREIGN PATENT DOCUMENTS

| FR | 2 910 732 | 6/2008 |
| GB | 2 381 290 | 4/2003 |
| WO | WO 2008-081088 | 7/2008 |

OTHER PUBLICATIONS

International Search Report for Application Serial No. PCT/US2011/027502 dated Apr. 27, 2011.

(Continued)

*Primary Examiner* — Jeffrey Allen
*Assistant Examiner* — Jennifer Castriotta
(74) *Attorney, Agent, or Firm* — Eric J. Robinson; Robinson Intellectual Property Law Office, P.C.

(57) ABSTRACT

A "no profile" electrical box, integrated flange/protective assembly and interchangeable cover that obscures standard electrical outlets such that a wall surface appears nearly continuous, uninterrupted by the outlet or cover when in use or not in use. The profile of the combined unit equals only the thickness of the material from which it is constructed; no hinges, screws or fasteners of any kind are visible and no part of the assembly requires detachment or storage when the outlet is in use, as the hinged cover is undetectably stored in the electrical box, or may be used to cover the electrical cords when engaged in the outlet. Exemplary embodiments of the cover obscure the electrical outlet. Together, the electrical box and flange assembly allow the electrical outlet to be flush mounted or recessed interchangeably, even after installation.

17 Claims, 31 Drawing Sheets

(56) References Cited

U.S. PATENT DOCUMENTS

| | | |
|---|---|---|
| 7,396,996 B1 | 7/2008 | Shotey et al. |
| 7,648,043 B2 | 1/2010 | Chen |
| 7,667,145 B2 | 2/2010 | Dinh et al. |
| 8,217,264 B2 | 7/2012 | Gow |
| 2003/0071047 A1 | 4/2003 | Harada |
| 2003/0080131 A1 | 5/2003 | Fukuo |
| 2006/0266756 A1 | 11/2006 | Okada et al. |
| 2006/0278422 A1 | 12/2006 | Drane |
| 2009/0266574 A1 | 10/2009 | Atkinson et al. |
| 2010/0072198 A1 | 3/2010 | Roemer et al. |

OTHER PUBLICATIONS

Written Opinion for Application Serial No. PCT/US2011/027502 dated Apr. 27, 2011.

European Search Report (Application No. 11753902.3) dated Jul. 23, 2014.

European Office Action (Application No. 11753902.3) dated Jul. 21, 2015.

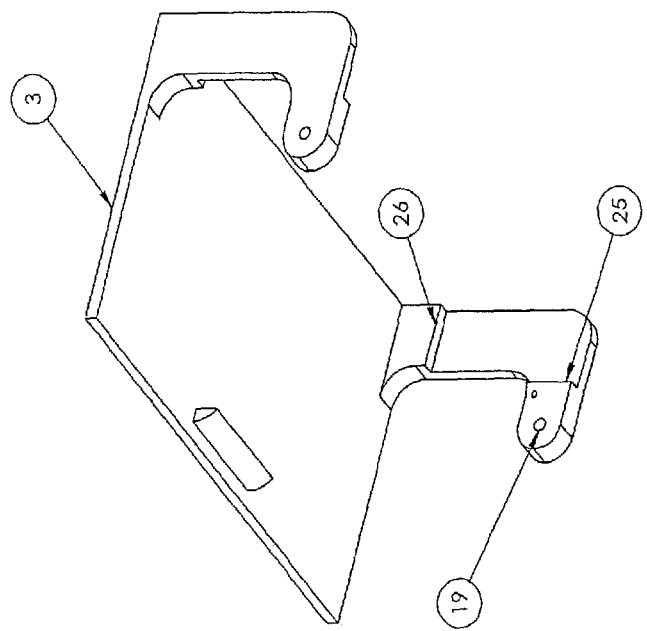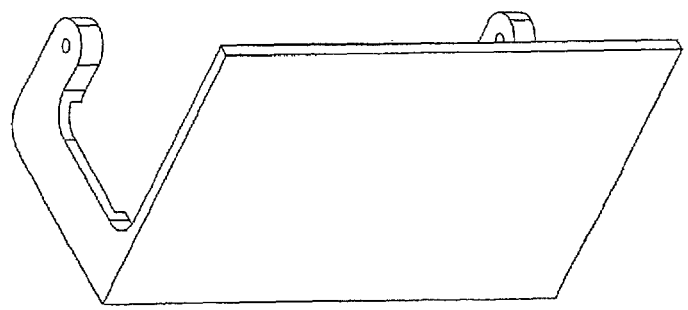
Figure 10

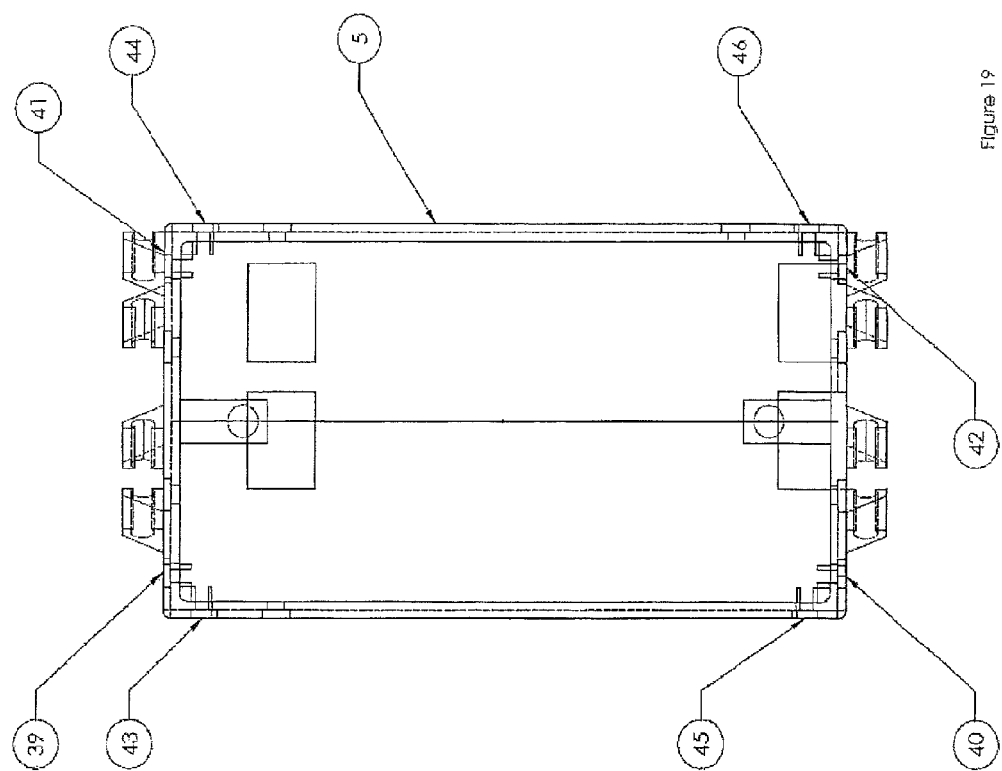

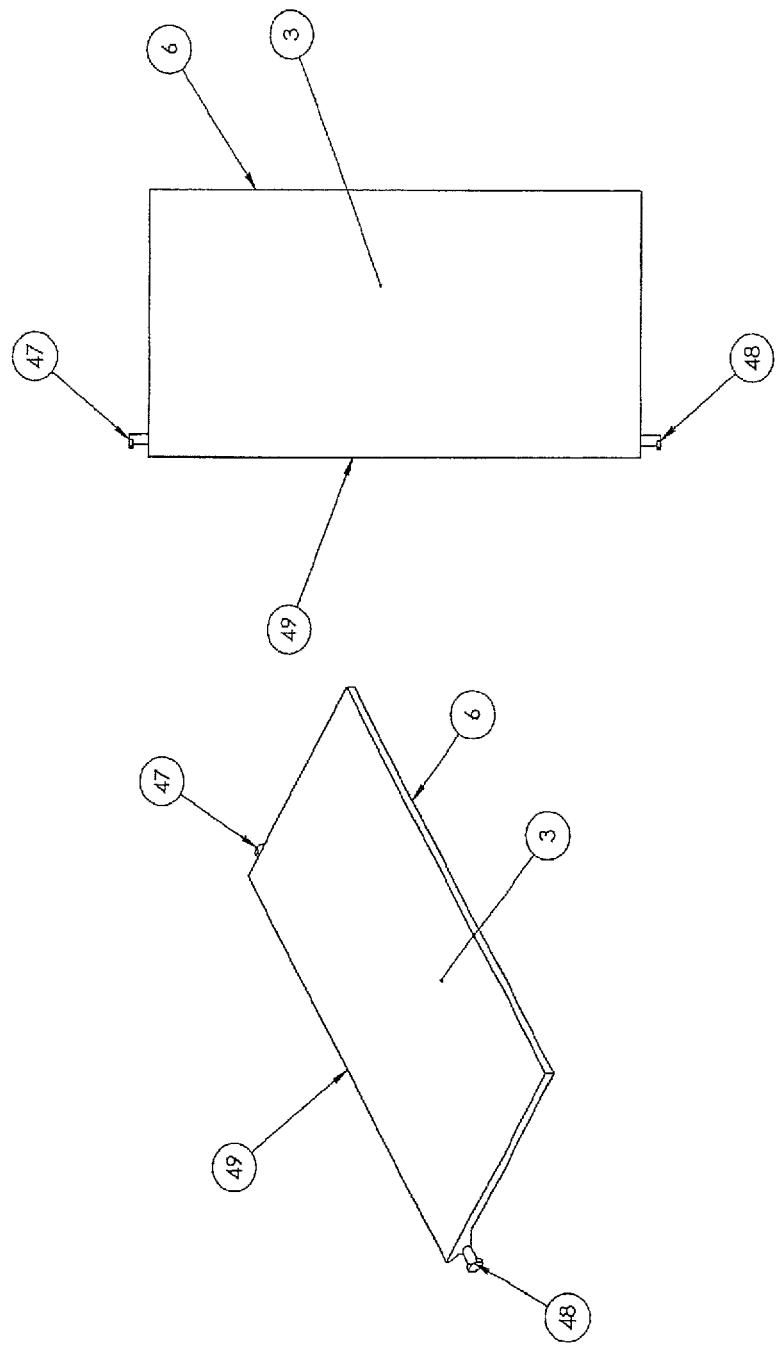

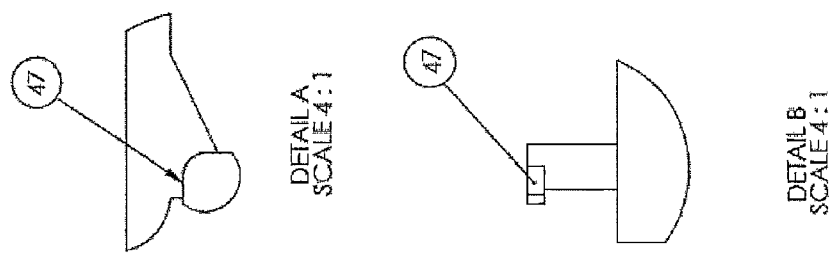
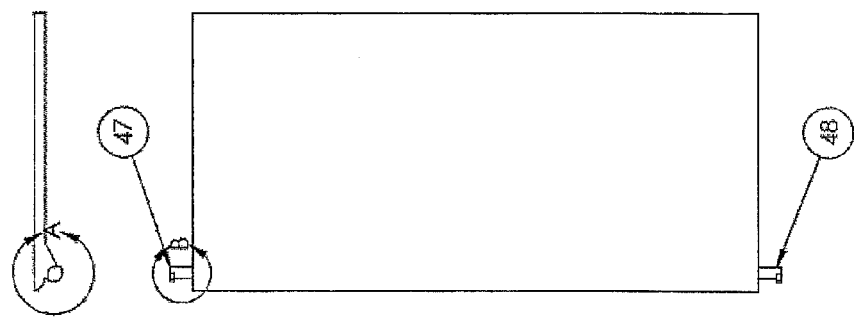
Figure 22

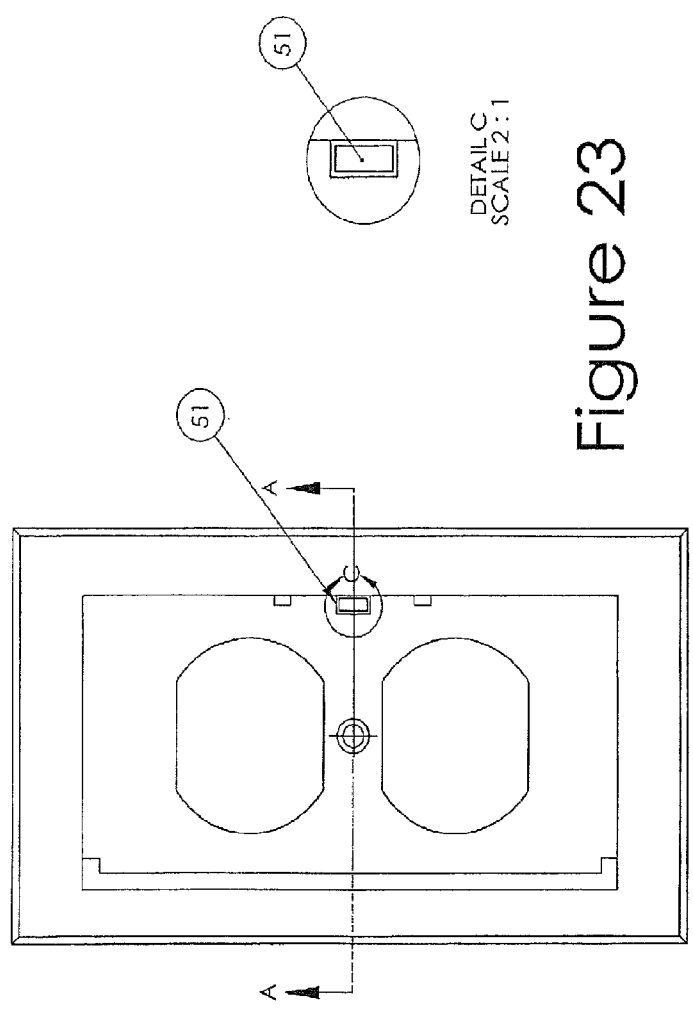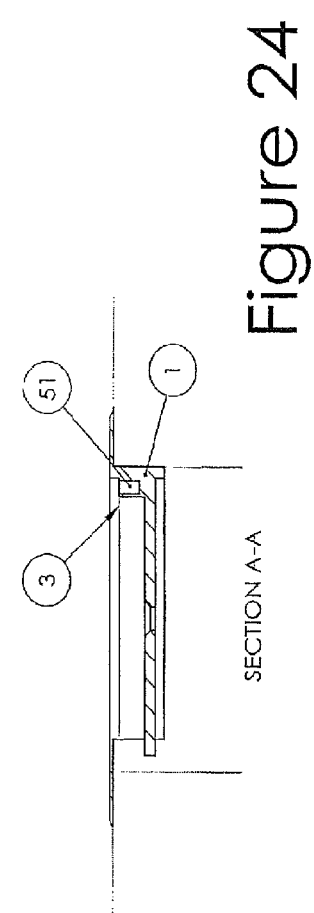
Figure 23
Figure 24

ELECTRICAL BOX, INTEGRATED FLANGE AND COVER MECHANISMS

BACKGROUND OF THE INVENTION

1. Field of the Invention

The present invention relates to mechanisms for mounting electrical outlets.

2. Description of the Related Art

Techniques for mounting and covering standard electrical outlets are innumerable. Most variations concern one of three themes, (i) safety for small children, (ii) aesthetics or (iii) recession for electrical cord management. Despite the abundance of related art in this sector, practically all indoor electrical outlet boxes and covers sold in the United States are of traditional design, with little of the patented derivatives finding any level of commercial appeal. The failure of current designs to penetrate the commercial market results from the following:

i) In terms of safety: obtrusive aesthetic design, excessive manufacturing cost or difficulty in installation. Electrical outlet installation is generally permanent in nature, while children's safety is required only periodically and temporarily. Safety features impede normal access to outlets in such a manner as to deter the housing developers from incorporating permanent inconveniences to a majority of customers on behalf of a minority of customers. Also, the construction necessary to retrofit an outlet for this temporary purpose is cost prohibitive and impractical. Therefore add-on temporary products such as plastic electrical outlet safety caps dominate the marketplace.

ii) In terms of aesthetics, most designs, (a) amount to a derivative of a cap that protrudes from the wall, clearly visible and therefore creating limited appreciable aesthetic benefit, (b) incorporate covers that either require storage elsewhere when the outlet is in use or that are more obtrusive when the outlets are in use than cover-free outlets, (c) require excessive manufacturing cost, (d) require additional labor for the home and office contractors.

iii) In terms of recessed outlet design, (a) too many electrical devices utilize low voltage transformers or other plugs that a recessed outlet will not accommodate, thereby preventing prevalent installation, (b) a recessed design that fails to incorporate aesthetic closures and easy closing mechanisms offers limited benefit outside of special applications. As a result, installations of such designs are relegated to specialty uses such as wall-mounted audio visual equipment.

Home builders recognize the aesthetic detraction of standard outlets, as evidenced by the increasing practice of obscuring kitchen outlets through under-cabinet mounting, despite more difficult access for consumers. Such mounting preserves the clean, uninterrupted visual appearance of a kitchen wall. However, no other room in a home or office building offers such a means of obscuring the electrical outlets in a manner that would preserve the aesthetics of an un-breached wall. The lack of commercial penetration by electrical boxes other than of standard design is evidence that no current design has incorporated the four necessary elements:

(i) aesthetically appealing design,
(ii) user-friendly mechanical operation that provides easy access to the outlet,
(iii) competitive manufacturing cost, and/or
(iv) the same field installation steps as used for standard boxes and covers, In terms of aesthetic improvement referenced in (i) above, the outlet, when not in use should closely resemble the surrounding wall. Features that can improve the aesthetic appearance so include (a) minimal profile such that difference in depth is difficult to perceive, (b) no exposed screws or hinges, (c) limited gaps around the cover closure and (d) paintable material to be painted the same color as the drywall.

Proper mechanical operation referenced in (ii) above, requires that the outlet not be particularly more difficult to access than are standard exposed outlets, can be accessed with one hand while holding an electrical plug and/or must not require the removal and storage of a detachable cover.

As referenced in (iii) above, the parts used for mechanical operation and the general design as a whole cannot be significantly more expensive to manufacture than standard boxes and cover plates.

Installation of the box, flange and cover in new construction must be consistent with current practice as referenced in (iv) above, requiring no additional labor, time, or skills to install.

A design that sufficiently incorporates any of the individual elements would be unique. A design that incorporates all elements in combination would be additionally unique. However, no prior art has produced designs of any one of these elements sufficient to penetrate the current marketplace with these individual attributes and particularly in combination with one another.

SUMMARY OF THE INVENTION

The present invention is a multi-configured electrical box, integrated flange and various cover mechanisms. Each feature of the multi-configured electrical box, flange and cover represent a separate embodiment and each design can be independent of, and freely combinable with, the others. An object of the present invention is to obscure electrical outlets in new construction and remodeling such that when not in use, they are generally indistinguishable from the surrounding wall and when in use are no more, or are less prominent than standard uncovered outlets. Also, by obscuring and covering outlets, the invention provides a level of safety for children and provides energy savings. Although the information herein, including the Detailed Description, concerns the concealment of electrical outlets, the present invention could be readily adapted to cover any type of outlet including a phone jack, cable outlet, or other outlet as understood by one of ordinary skill in the art. Furthermore, while such electrical outlets are generally described as adjoined by a drywall surface, the invention is not so limited and may be installed, for example, on floors, ceilings and at other desirable locations having a variety of surface materials.

The electrical box integrates and incorporates various cover mechanisms such that covers are unseen when the outlet is in use and certain mechanisms obscure the connection between the electrical plugs and outlets when outlets are in use. One embodiment of the box is configured to allow the electrical outlet to be mounted in a recessed and un-recessed position interchangeably before and after original outlet installation. The box is vertically reversible and therefore capable of mounting on either side of a 2×4 frame. The technique for installing the box, cover and flange are virtually identical to those required for standard outlets.

The integrated design of the electrical box, flange and cover obscure the outlet when not in use. Other embodiments can obscure one outlet when the other is in use, can obscure both outlets when in use, and/or can be recessed inside the electrical box, undetectable when the outlet is in use.

Different embodiments incorporate various closure mechanisms, including: spring loaded counterweight, gravity, flat magnet, spring-loaded magnet, detent, or track mounted sectional doors, each closure mechanism accommodating the low-profile design of the cover and flange and is undetectable when the outlet is in use.

In the below embodiments of the present invention, the integrated flange covers the drywall cutout for the electrical box, protects from exposed wires in the outlet, seals the gap between electrical box and drywall from which energy is lost, and aligns with the cover when the cover is closed. In further embodiments, an interior compartment or wall further protects from exposed wires in the outlet. The configuration and fastening mechanism allows no screws or hinges to be exposed and for the flange to protrude from the wall by only the width of the material from which it is constructed. The alignment with the closed cover and the low profile design provide the illusion of no-profile cover flush with the wall.

The invention overcomes limitations of related art as follows:

1. Aesthetics: The protrusion of covered outlets when viewed from the front and particularly from the side has significant affect on perceived aesthetics. Second to color, depth of an object compared with its immediate surroundings most heavily influences its relative prominence. Depth is a perceptual process function involving three-dimensional organization of stimuli. Contributors to the perception of objects include shadows, which indicate distance, linear perspective, the convergence of parallel tracks or lines as they recede into the distance and among others, retinal disparity— the differences among images on the retinas of the two eyes. In order to accommodate the effect that depth perception has on the prominence or obscurity of an object, the design of the invented item incorporates the lowest profile possible and alignment of all components via the relationship between the door, flange and wall. For example, specific embodiments may achieve a profile of 1 mm-2 mm (depending on the material used); however, the invention is not limited to such a range. This depth to the wall averages approximately 900% less than that of related art. This is accomplished by the integrated design of box, flange and cover as more thoroughly described under Detailed Description.

Unlike prior art, the invention does not include exposed screws or other fasteners, hinges, or the profile associated with these mechanisms.

When the outlet is in use, the cover remains attached to the unit. Through the hinge system of the box, the cover opens to one side and inside the box, obscured from view. This differs from prior art that, when the outlet is in use, includes (i) plates that slide over the wall, substantially increasing the prominence of the unit by increasing the area covered by the outlet and its components, (ii) hinge systems that protrude out from the wall, causing the cover to rest partly over the electrical plugs and therefore more prominent than are uncovered outlets when engaged and (iii) removable covers that require storage.

2. Ease of access: Related art uses covers that impede access, removable covers and other mechanisms that require two hands or two steps in order to engage an electrical device with an outlet. The lack of market penetration by related art partly reflects that the marketplace will not sacrifice functionality for aesthetics, in addition to limited aesthetic benefits having been introduced. The cover of the invented item can be opened with one hand while holding the electrical cord. Once opened, the cover does not interfere with the effort to engage the electrical cord in the outlet and is then easily recessed into the wall with the same hand. The hinge and pocket for cover and closing systems are more thoroughly described under Detailed Description.

3. Child Safety. The lack of market penetration by related art that is primarily designed for child safety reflects the inconvenience of use by other than children, the manufacturing cost to construct the units, and in some cases, difficult and time consuming installation. Conversely, the camouflage nature of the invented item reduces interest of children and the closing mechanisms can provide child safety without impeding use by others or adding cost.

4. Energy Savings. According to the U.S. Department of Energy's 'Energy Savers Tips on Saving Energy and Money at Home', two percent of air escapes through electrical outlets/switches. This occurs due to the space between the drywall cut and the electrical box and through the outlet sockets. The flange of the invented device seals the area between the drywall and the electrical box. The cover of the invented device creates a barrier between the outlet sockets and the room. Together the flange and cover virtually eliminate this type of energy loss and do so whether none, one, or both outlets are in use.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF DRAWINGS

FIG. 10 is a view showing an integrated hinge and cover of the present invention.

FIG. 19 is a view showing a closure mechanism of the present invention.

FIG. 20 is a view showing a single cover.

FIG. 21 is a view showing cover attachment points of the present invention.

FIG. 22 is a view showing cover hinge nodules.

FIG. 23 is a view showing a hollow receptor of the present invention.

FIG. 24 is a view showing a receptor affixed to a flange and abutting a cover of the present invention.

DETAILED DESCRIPTION OF THE INVENTION

Embodiment modes of the present invention are explained below with respect to the drawings. However, implementation of the present invention can be achieved in various different modes and with modifications readily understood by those of ordinary skill in the art. Therefore, the present invention should not be construed to be limited to specific embodiments of the present invention, including universal box configurations or other integrated designs.

Embodiment 1

Figure 2:
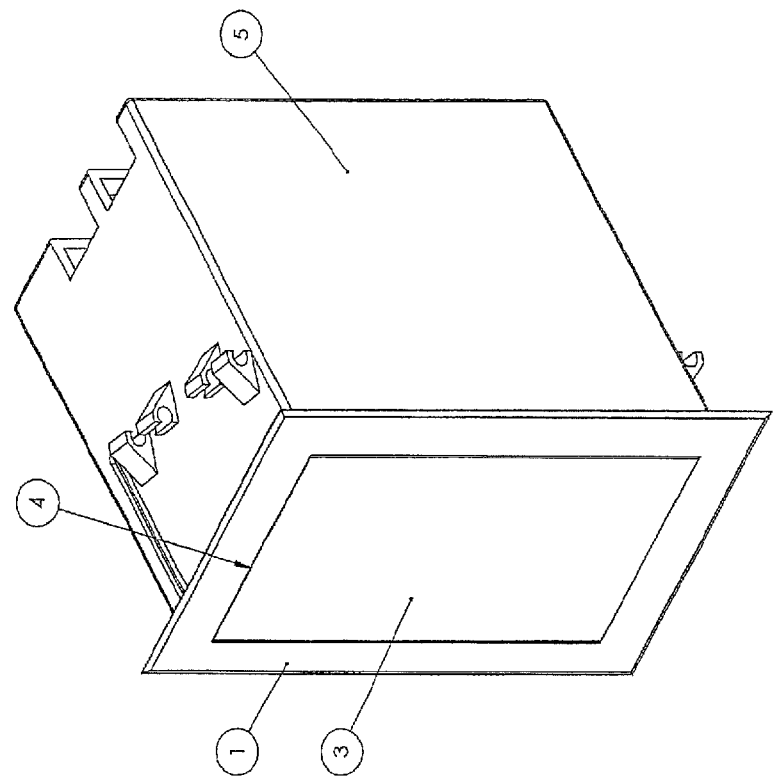
FIG. 2 is a side view showing an electrical box, flange and cover of the present invention.
Figure 1:
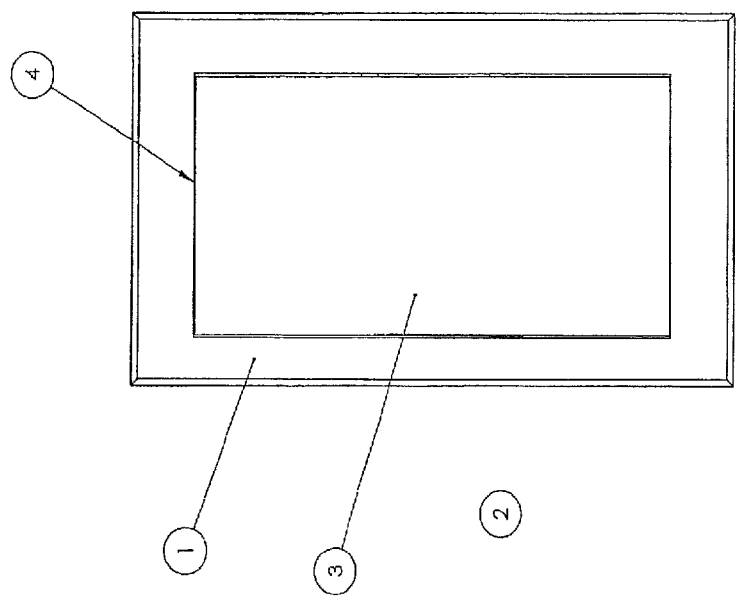
FIG. 1 is a front view showing a flange and cover of the present invention.

FIGS. 1 and 2 show the fully assembled unit, front and side view, installed with cover closed. The flange 1 surrounds and integrates the unit into the surrounding drywall 2. Cover 3 is closed with only the outline 4 of the intersection of the flange and cover being visible. The electrical box 5 shown in FIG. 2, which is an integral component of the present invention, is obscured in FIG. 1 and the electrical outlet is obscured in FIGS. 1 and 2.

Figure 3:
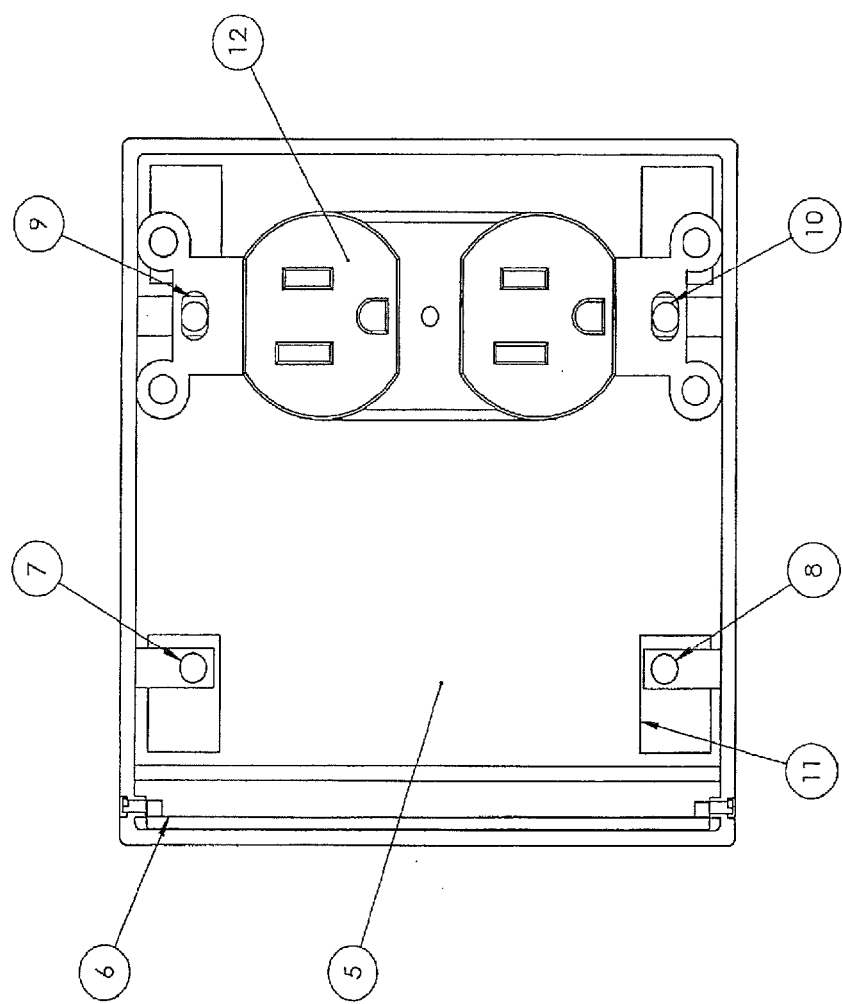
FIG. 3 is a front view showing an electrical box of the present invention.

FIG. 3 shows the electrical box 5 having a height of 4.25". The single cover is retracted into the open box and only the leading edge 6 of the cover is exposed.

Top mounting plates 7 and 9 and bottom mounting plates 8 and 10 include electric outlet stabilizing tabs 11. On standard electrical boxes, the stabilizing tabs of the outlet rest on the outside edge of the box and extend beyond the top and bottom of the box.

According to one example of this embodiment, top mounting plate 7 and bottom mounting plate 8 may be formed, for example, recessed 1.75" in electrical box 5 to allow outlet 12 to be installed such that the face of outlet 12 is recessed approximately 1.5" from the front edge of electrical box 5.

According another example of this embodiment, top mounting plate 9 and bottom mounting plate 10 may be formed, for example, recessed ¼" in electrical box 5 to allow outlet 12 to be installed such that the face of outlet 12 is recessed approximately ⅛" from the front edge of electrical box 5. Furthermore, electrical box 5 is formed having a width sufficient to accommodate side by side outlets.

The dual mounting configuration of electrical box 5 allows outlet 12 to be mounted in electrical box 5 over top mounting plate 7 and bottom mounting plate 8 in order to be fully recessed, or over top mounting plate 9 and bottom mounting plate 10 in order to be slightly recessed and is interchangeable during initial home or of installation, or even after initial installation.

By recessing outlet 12 inside the electrical box such that face of outlet 12 is recessed in accordance with this first embodiment, single vertical cover when closed, will align flush with flange 1, which is flush with the wall on which electrical box 5 is installed and separated only by the thickness of the material from which flange 1 is constructed. For the purpose of simplicity, all electrical boxes subsequently shown in this application are "single gang boxes" with only one set of mounting brackets.

Figure 4:
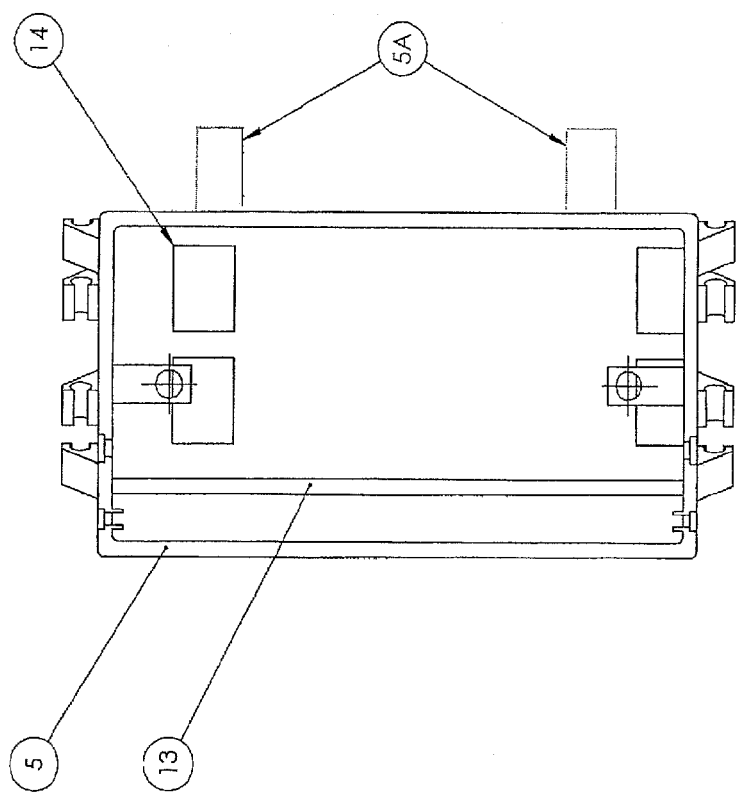
FIG. 4 is a front view showing an electrical box of the present invention.

FIG. 4 shows a front view of electrical box 5 without the outlet 12 installed. The invention's second interior wall 13 attaches to the back wall of the electrical box 5 and continues toward the front edge of the electrical box to the approximate depth of the bottom of the electrical outlet when installed. This creates a channel into which the cover in embodiments 2 and 3 may recede into the box without interference by electrical wire entering and/or exiting the electrical box. It also serves to separate the electrical connections from the flange opening, in accordance with Underwriters Laboratories safety specifications. Interior wall 13 would be included on any one or all four walls of the electrical box, depending on the intended cover configuration. The proximity of each interior wall 13 to the knockout tabs 14 for entry and exit of electrical wires into and out of the electrical box is shown. Guide tabs 5A are recessed from the leading edge of the electrical box by a depth determined by the thickness of the drywall. It extends for approximately 1.5" perpendicular to the box, which is the approximate width of a 2×4 wooden stud. This provides for more consistent mounting of the box on a wooden stud than do the small notches on standard boxes which can be affected by the rounding of the corners of many 2×4s. The depth of the box in relation to the drywall is significantly more acute in this integrated design than with standard boxes and covers. Consistent mounting of the box in relation to the drywall is required in order for the cover, when closed, to align flush with the flange which is almost flush with the drywall, in keeping with the objective of the integrated design, to obscure the outlet. Guide tabs 5A may be incorporated into each of Embodiments 1-4.

Figure 5:
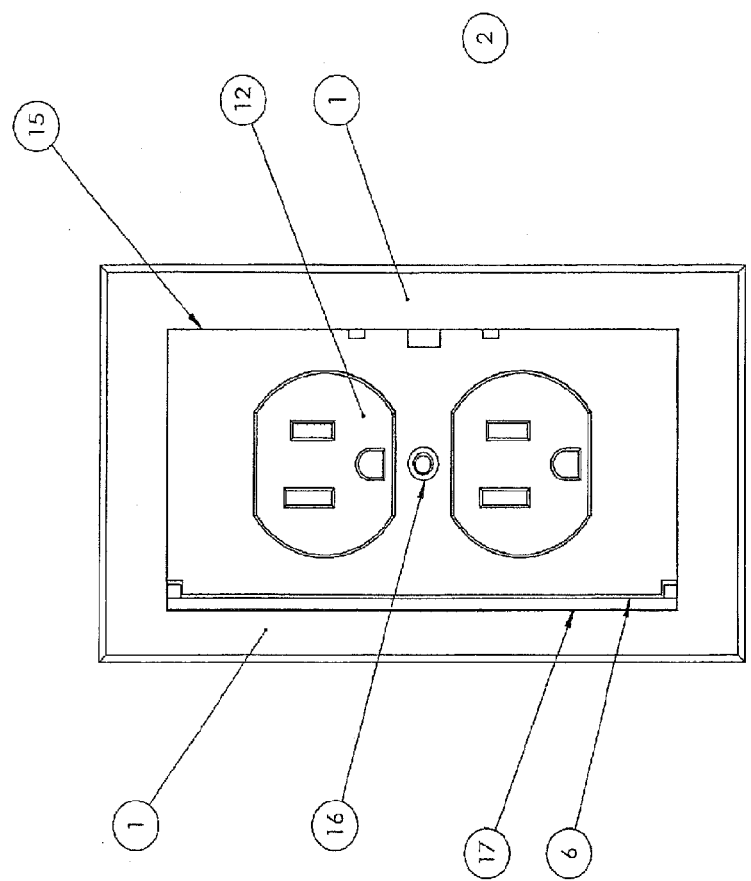
FIG. 5 is front view showing an installed flange with open cover.

FIG. 5 shows the flange 1 to be used with the electrical box (not shown). Outlet 12 is in either mounting position 7/8 or 9/10 as previously outlined in FIG. 3.

The flange 1 rests flush on the drywall 2 protruding from the wall only by the width of the material from which it is constructed. The flange 1 crosses the plane defined by the front of the electrical box (not shown) and immediately recesses into the electrical box at point 15 to a depth that is relative to the positioning of the outlet, 7/8 or 8/10 as indicated in FIG. 3. The flange 1 continues from both ends toward the center of the electrical box and is attached at the center screw 16 of outlet 12. In this manner, the flange protects the electrical wires and screws on each side of the receptacle. The connection mechanism of the flange at the center screw 16 in either outlet position 7/8 or 9/10 is obscured when the cover is closed. The flange is therefore one continuous unit, except that the portion of the flange on the hinge side of the electrical box stops as it crosses the plane of the electrical box (not shown) at position 17, providing a channel for the cover in embodiments 2 and 3. Only the leading edge 6 of the open cover is exposed. When the cover is closed, the flange 1 at position 17 abuts and is flush with the trailing edge of the cover (not shown). FIG. 5 shows a flange configuration for a single cover, hinged on the left side of electrical box. However the cover and flange could be configured similarly for hinging at the right, bottom, or top of electrical box, or any combination. Ground Fault Interrupter ("GFI" plugs) are configured in the same manner except that the attachment points of the flange would be at the top and bottom of the stabilizer mounts on the GFI plug 7/8, 9/10 respectively, as shown on FIG. 3, because center screws are not incorporated into GFI outlets.

Figure 6:
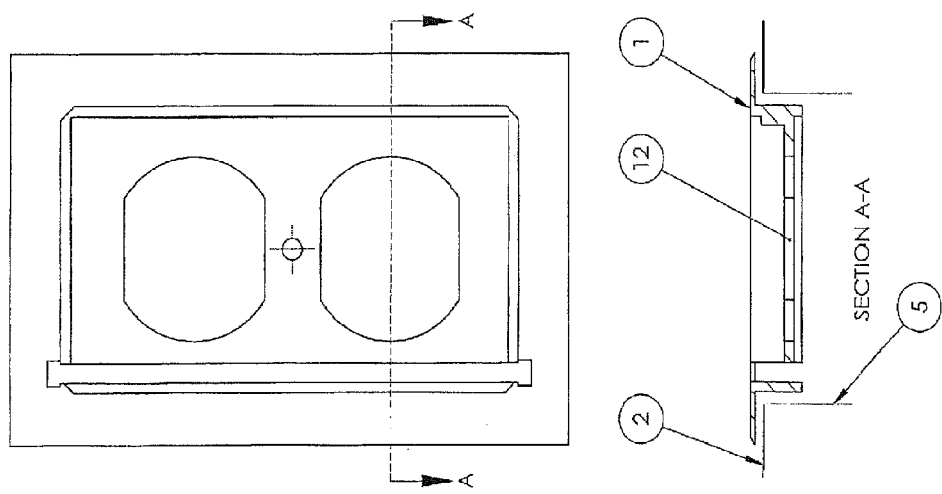
FIG. 6 is a cutaway view of a flange of the present invention.

FIG. 6 shows a cutaway view of the flange 1, extending approximately ½ inch over the drywall 2 cutout for the electrical box 5, on all four sides. The flange 1 enters the electrical box 5 on one to three walls of the electrical box depending on cover configuration. It would not extend into the electrical box on the hinge side(s) of the electrical box, as shown in FIG. 5. On all sides, the flange 1 extends toward the outlet 12, protecting the electric wiring.

Figure 7:
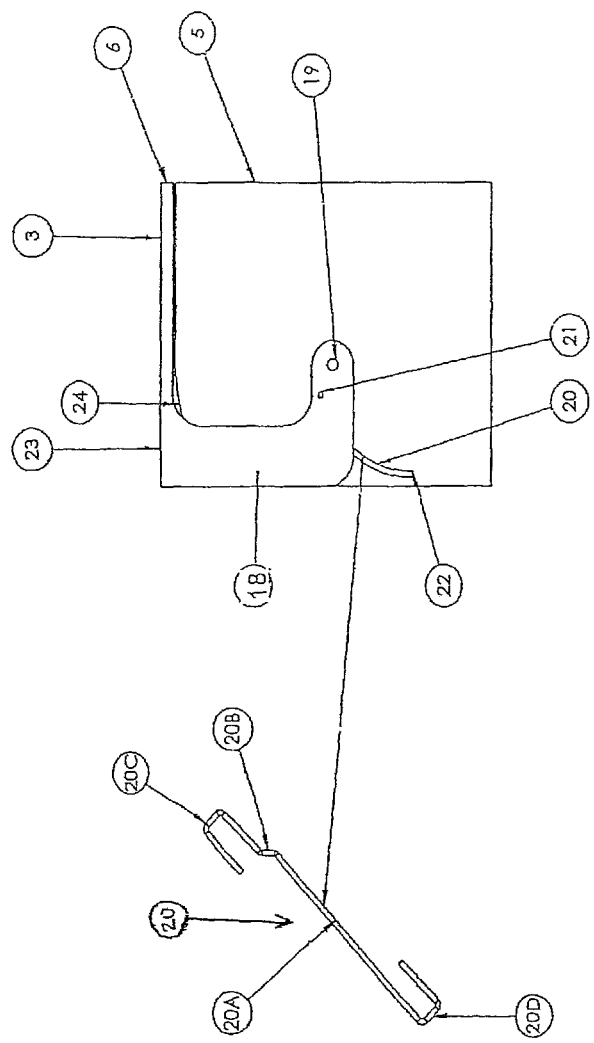
FIG. 7 is a view showing a closure mechanism and a cover of the present invention in a closed position.

FIG. 7 shows the first embodiment of the closure mechanism of the electrical box 5. The electrical box is viewed from the bottom, with cover 3 in the closed position. The hinge 18 and cover 3 are formed as one molded or injected piece and are attached to electrical box 5 at 19 and on the opposing side of electrical box 5. Note that the hinge can be attached to the interior or exterior of the electrical box. The wire spring 20 is attached to hinge 18 at 21 and to electrical box 5 at 22. The expanded view of wire spring 20 shows its shape, which includes a portion 20A, a minimal offset 20B and opposing 180 degree bends at 20C and 20D. This spring holds the cover closed when cover is closed and holds the cover open when cover is open and it prevents cover from being left partially open where it could be damaged by people or animals walking by the outlet. The hinge and spring act as a counterweight, allowing the cover to be opened by pressing the cover 3 at 23, eliminating the need for a handle or finger hole to open cover, supporting the purpose of the design which is to provide the appearance of an uninterrupted wall and obscuring the outlet. The electrical box 5 is angled at 24 to allow the cover to rotate down as further shown in FIGS. 8 and 9.

Figure 8:
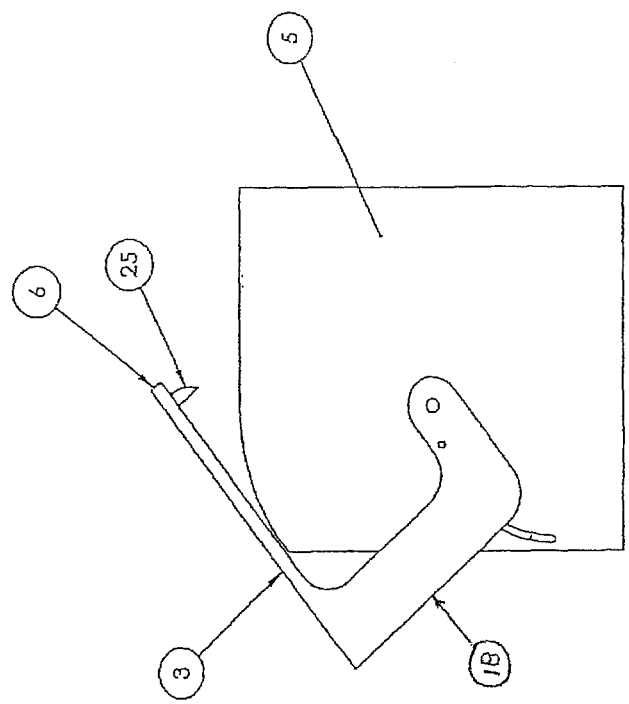
FIG. 8 is a view showing an electrical box and a cover of the present invention at a midpoint between fully open and fully closed.

FIG. 8 shows the electrical box 5, viewed from the bottom with cover 3 at the midpoint between opened and closed. The tab 25, extends from the leading edge 6 of cover 3, allowing cover, when open and recessed, to be lifted, and it is obscured when cover is closed, further supporting the intention of the design to provide the appearance of an uninterrupted wall.

Figure 9:
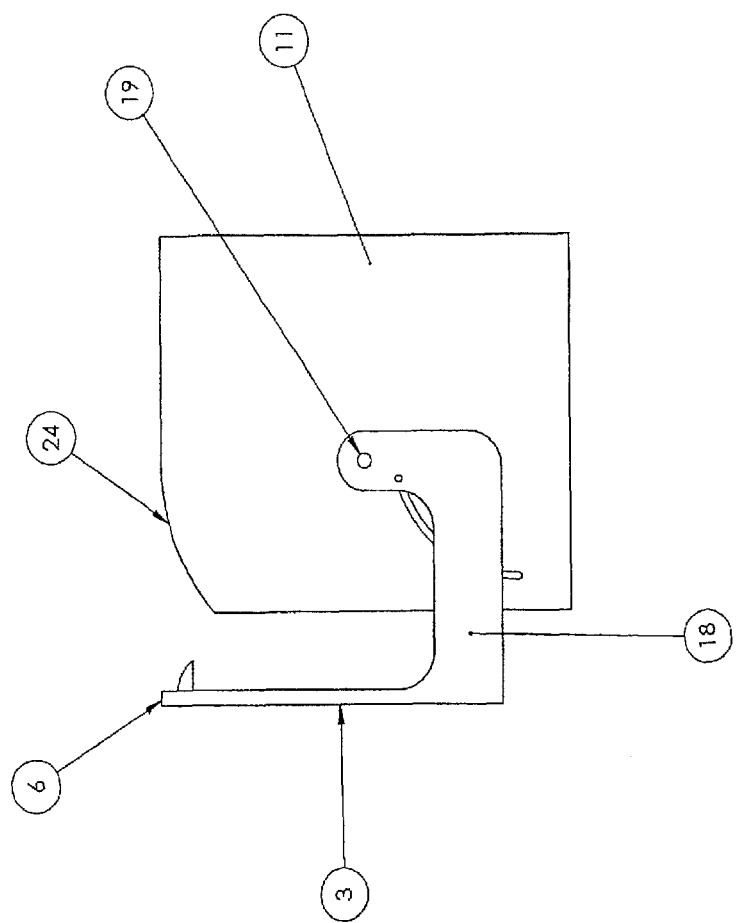
FIG. 9 is a view showing a cover of the present invention in an open position.

FIG. 9 shows the cover 3 in the fully open position. In this position, the hinge 18 is attached to the outside of electrical box 5 at 19 and the cover rests outside the electrical box 5. If the hinge 18 is attached inside of the electrical box 5 at 19, the cover rests inside the electrical box 5. Whether the hinge is mounted outside or inside electrical box 5, only leading edge 6 is exposed when cover is open, as also shown at 6 of FIG. 5. The box is angled at 24, as also shown in FIG. 7.

FIG. 10 shows the construction of integrated hinge and cover such that the hinge attached to an electrical box at connection point 19, angles approximately 90% at 25, then angles approximately 90% at 26.

Embodiment 2

Figure 11:
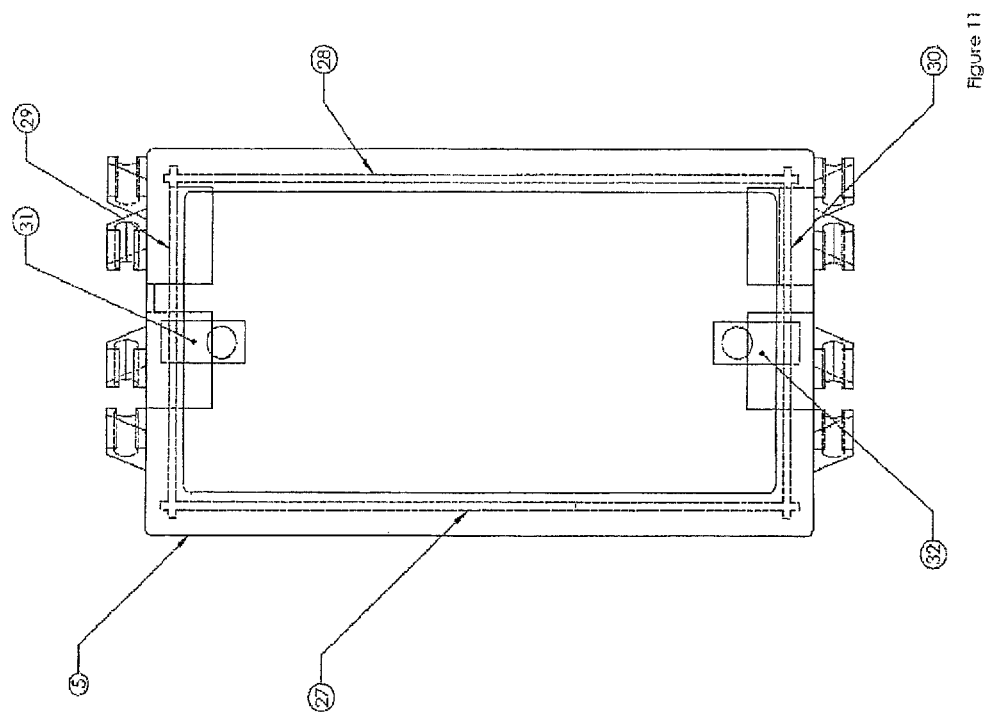
FIG. 11 is a front view showing an electrical box of the present invention.

FIG. 11 shows an electrical box according to a second embodiment of the present invention. The electrical box 5 in Embodiment 2 is substantially similar to the electrical box in Embodiment 1; however, the closure mechanism differs. The closure mechanism in Embodiment 2 is formed as dual tracks 27 and 28 built into the electrical box, in which a sectional door, attached to a roller, shall be inserted, much like a vertically operated garage door and track. This door (or cover) retracts into the electrical box, which is designed to accept the door due to the box width, internal hinge tracks, and interior box wall (not shown) that prevents interference from electrical wires inside the box, each more fully described under FIG. 4. When combined with the cover configuration shown in FIG. 13, the electrical outlet is obscured when not in use. Tracks 29 and 30 would support a horizontal (close across) closure utilizing the closures shown in FIG. 15 or FIG. 16. Screw holes 31 and 32 for outlet attachment to electrical box 5 would be attached to box 5 behind tracks 29 and 30 so not to interfere with cover movement.

Figure 17:
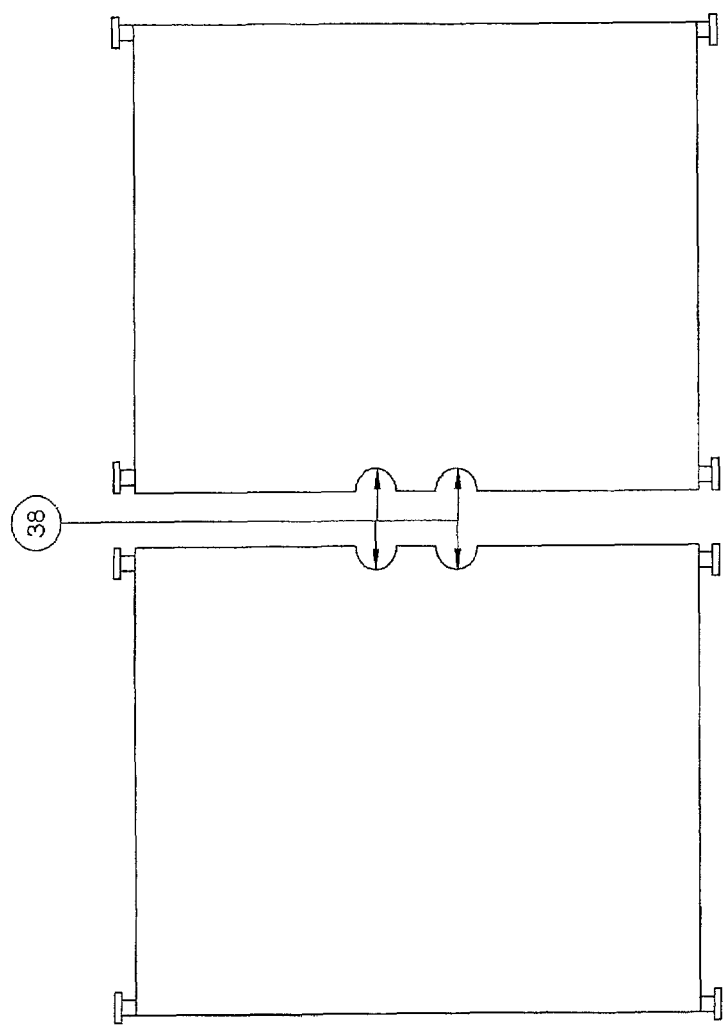
FIG. 17 is a view showing a cover of the present invention.

When tracks 29 and 30 are used and when combined with outlet positioning 7/8 in FIG. 2, and when combined with a split side-by-side cover as shown in FIG. 17, the connection point between the electrical wire and the electrical outlet is obscured, even when an electrical plug is engaged, providing the visual effect of electrical wires entering a wall.

Figure 18:
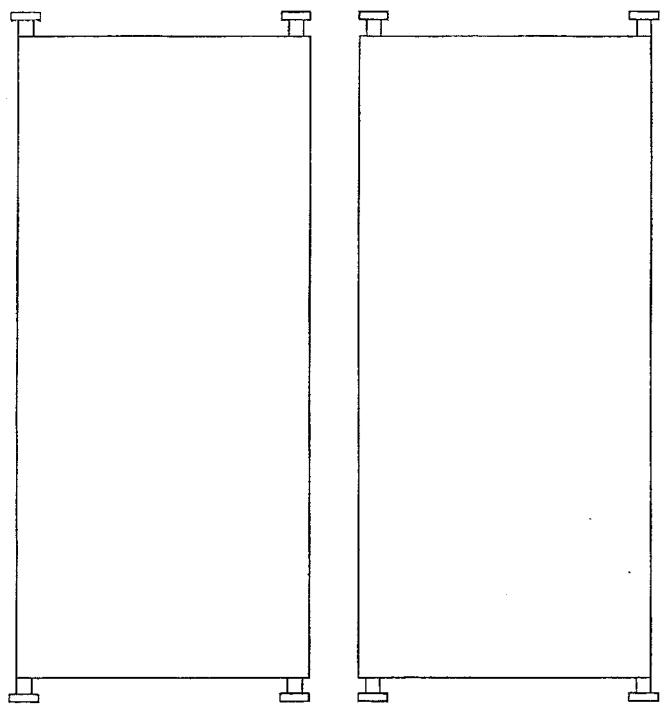
FIG. 18 is a view showing a split over/under cover of the present invention.

Tracks 27 and 28, when utilized in conjunction with cover shown in FIG. 18 and with outlet position 7/8 or 9/10 in FIG. 3, a single outlet connector may be covered while the other outlet connector is in use.

In each configuration, covers are stored in the electrical box when the outlet is in use, obscuring them from view.

Figure 12:
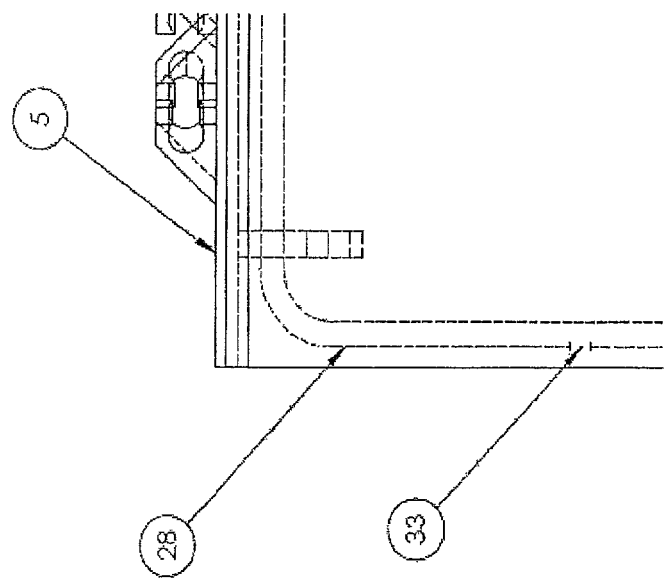
FIG. 12 is a cutaway side view of an electrical box and track of the present invention.

FIG. 12 shows a cutaway side view of electrical box 5 and track 28 supporting a vertical closure. An opening 33 in track 28 allows for the insertion of the rollers attached to the cover. A similarly styled insertion point would be utilized for tracks 27, 29 and 30 shown in FIG. 11.

Figure 13:
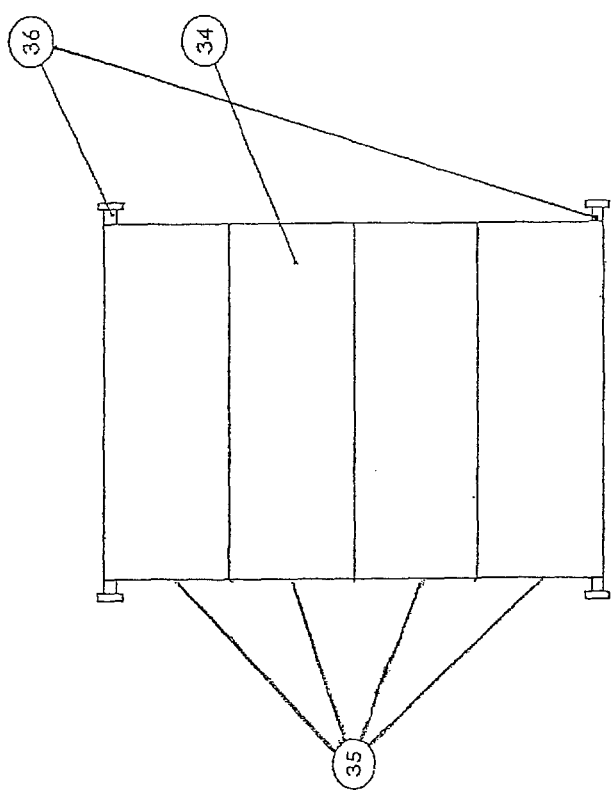
FIG. 13 is a view showing a cover of the present invention.

FIG. 13 shows a single vertically closing cover 34 constructed in various sections 35 and attached to rollers 36 that would mount into the hinge tracks 27 and 28 in FIG. 11.

Figure 14:
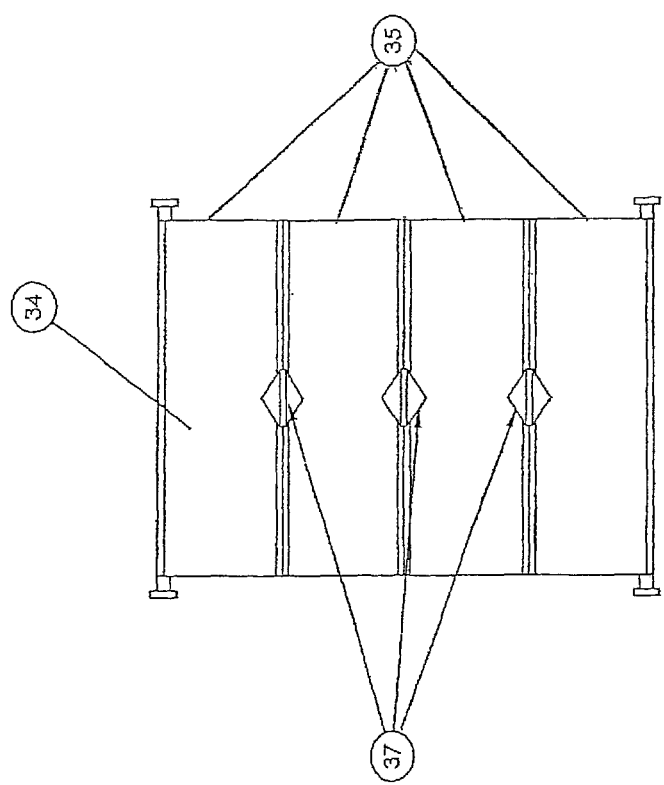
FIG. 14 is a back view showing a cover of the present invention.

FIG. 14 shows the back of cover 34 shown in FIG. 13 with hinges 37 at each section 35, holding the sections together allowing the cover to follow a curved track 28 of FIG. 12, FIGS. 15-18 show various cover configurations that would integrate with various cover track configurations in the second embodiment of the electrical box.

Figure 15:
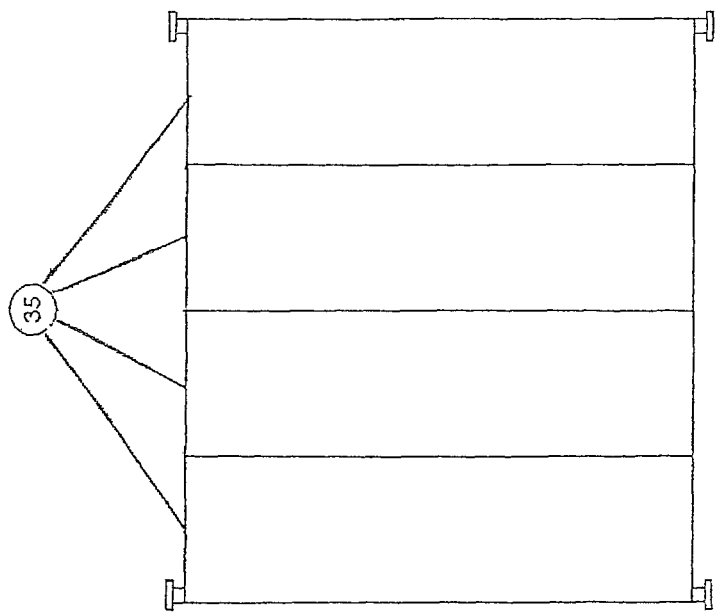
FIG. 15 is a view showing a cover of the present invention.

FIG. 15 shows a single cover that would mount into the hinge tracks 29 and 30 shown in FIG. 11. The door, built in panels or sections 35, allow it to follow in the curved tracks 29 and 30 in FIG. 11. Each cover in FIGS. 15-18 incorporate the same sectional design, though not shown.

Figure 16:
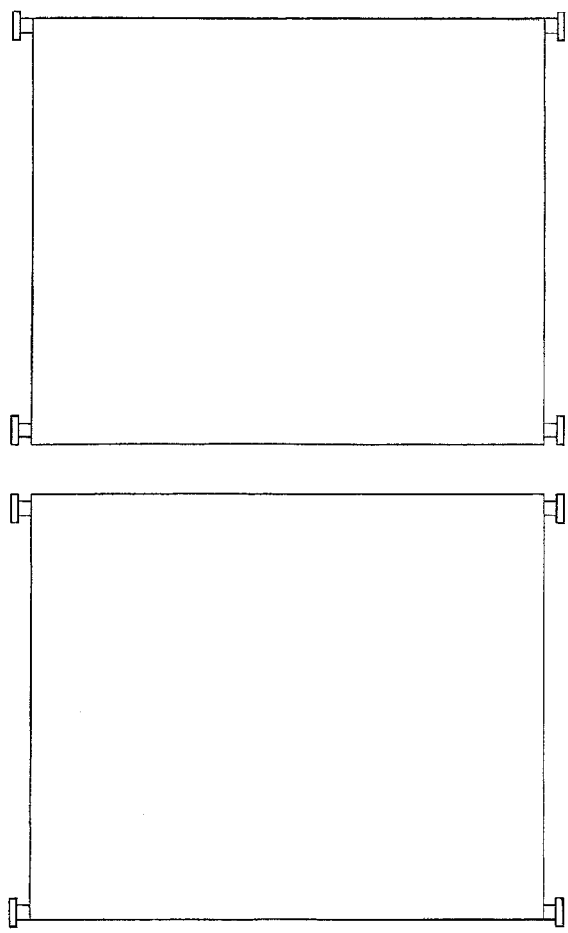
FIG. 16 is a view of a split side-by-side cover of the present invention.

FIG. 16 shows a split side-by-side cover that would mount into the hinge tracks 29 and 30 shown in FIG. 11. This configuration would be incorporated with recessed outlet positioning 7/8 in FIG. 3, obscuring the electrical plugs and outlet, even when in use.

FIG. 17 illustrates a close up view of the cover illustrated in FIG. 16, incorporating cutouts 38 for electrical cords engaged in the outlet. Spring-loaded sliding plates on the back side of each cover would obscure cutouts 38 when the outlet is not in use.

FIG. 18 illustrates a split over/under cover for use in hinge tracks 27 and 28 in FIG. 11, allowing one outlet to be covered while the other is in use.

Embodiment 3

FIG. 19 shows Embodiment 3 of the closure mechanism incorporated into the electrical box 5. The electrical box 5 in Embodiment 3 is substantially similar to the electrical box in Embodiments 1 and 2; however, the closure mechanism differs. The top mounted hinge tracks 39 and bottom mounted hinge tracks 40 are built into the electrical box 5, can receive cover hinges shown in FIGS. 20 and 21, and are formed on only one side of the electrical box 5, rather than three sides in Embodiment 2.

Tracks 41/42, when combined with 39/40, can receive split side-by-side covers. Tracks 43/44 provide a single vertical (close down) cover configuration and when utilized with tracks 45/46 and a split vertical cover, a single outlet may be obscured while other outlet is in use.

The invented electrical box could accommodate all or any one of the above configurations.

FIGS. 20 and 21 show that Embodiment 3 is configured to integrate solid (non-sectional) covers attaching only at cover hinge nodules 47 and 48 on the trailing edge 49 of the cover 3. The attachment points could be positioned at the bottom or top, or the left or right of all sides of cover 3, depending on the intended track configuration of electrical box as described in FIG. 19. The leading edge 6 of cover 3 is unattached to hinge tracks and therefore requires a separate closing mechanism including magnets or detents to hold it in place when closed. Conversely, Embodiment 2 includes a sectional cover attaching at four points to a curved track and therefore does not need a separate closure mechanism to hold it in place when closed.

FIG. 22 illustrates the shape of the cover hinge nodules 47 and 48. As shown in details A and B, the hinge is positioned on the inside of the cover such that the profile of the hinge would not exceed that of the cover and would not protrude from the drywall or electrical box when cover is closed.

FIG. 23 shows hollow receptor 51 that will accept a flat magnet mount or a touch latch magnet mount.

FIG. 24 shows the position of the receptor 51 affixed to flange 1 and abutting cover 3.

Figure 25:
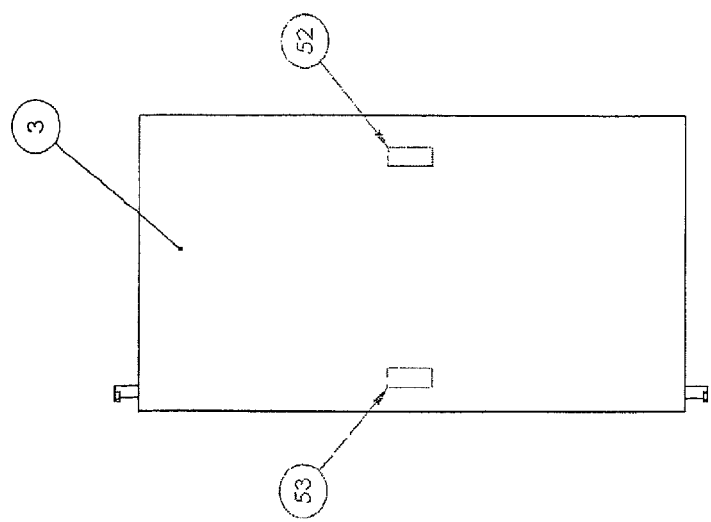
FIG. 25 is a view through a cover showing a receptor mount of the present invention.

FIG. 25 shows a see-through view through cover 3 to receptor 51 as described in FIGS. 23 and 24 positioned at either 52 or 53, depending on the cover configuration.

Figure 26:
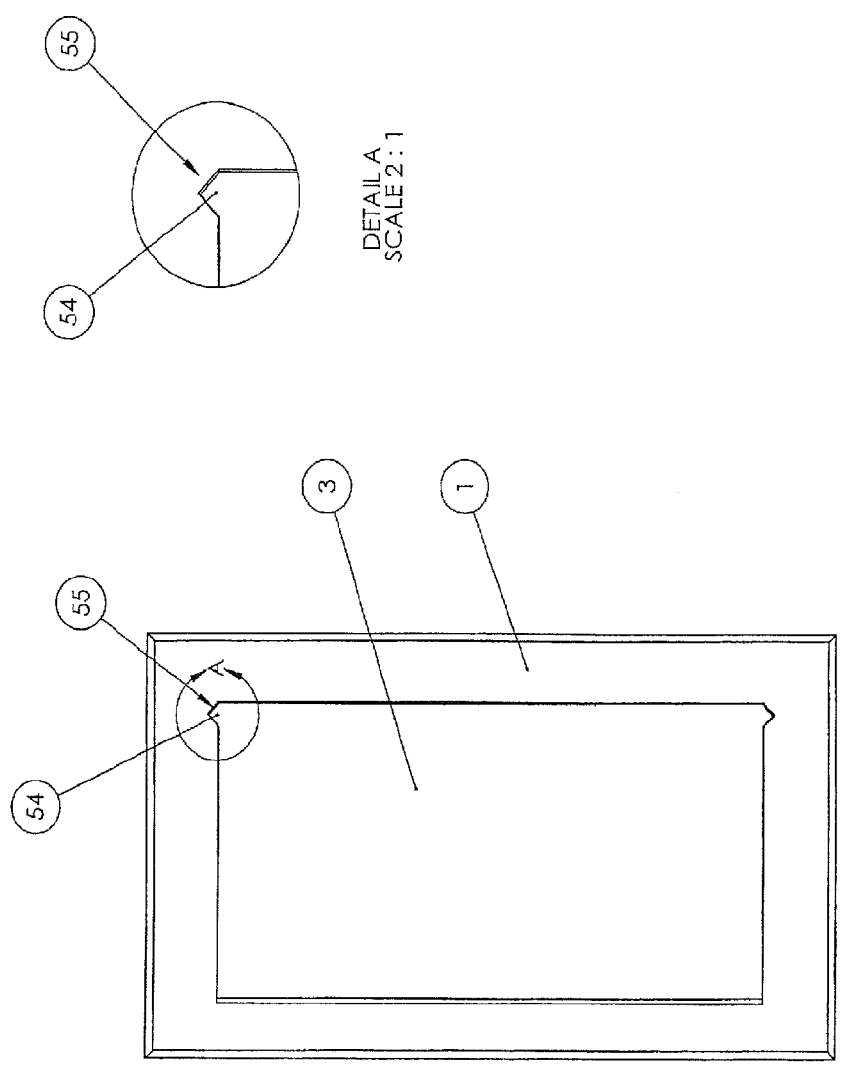
FIG. 26 is a view showing a detent closure mechanism of the present invention.

FIG. 26 shows a detent closing mechanism 54 built into cover 3 with an opposing detent 55 in flange 1.

Embodiment 4

Figure 27:
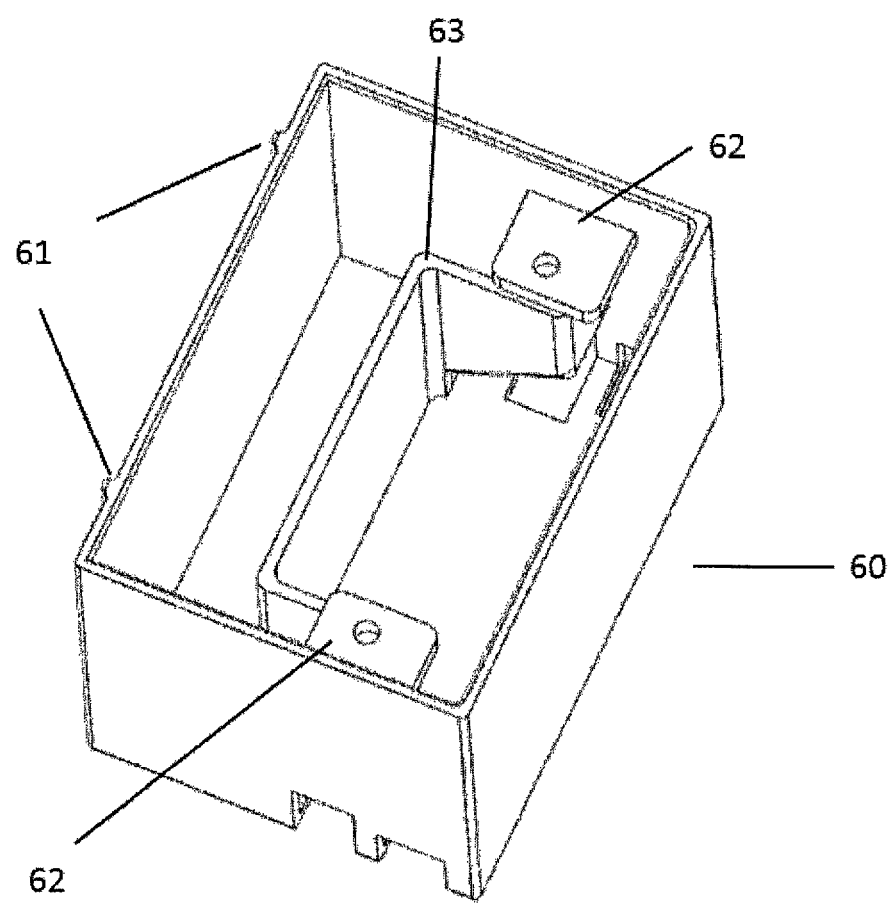
FIGS. 27 and 28 are views showing an electrical box of the present invention.
Figure 28:
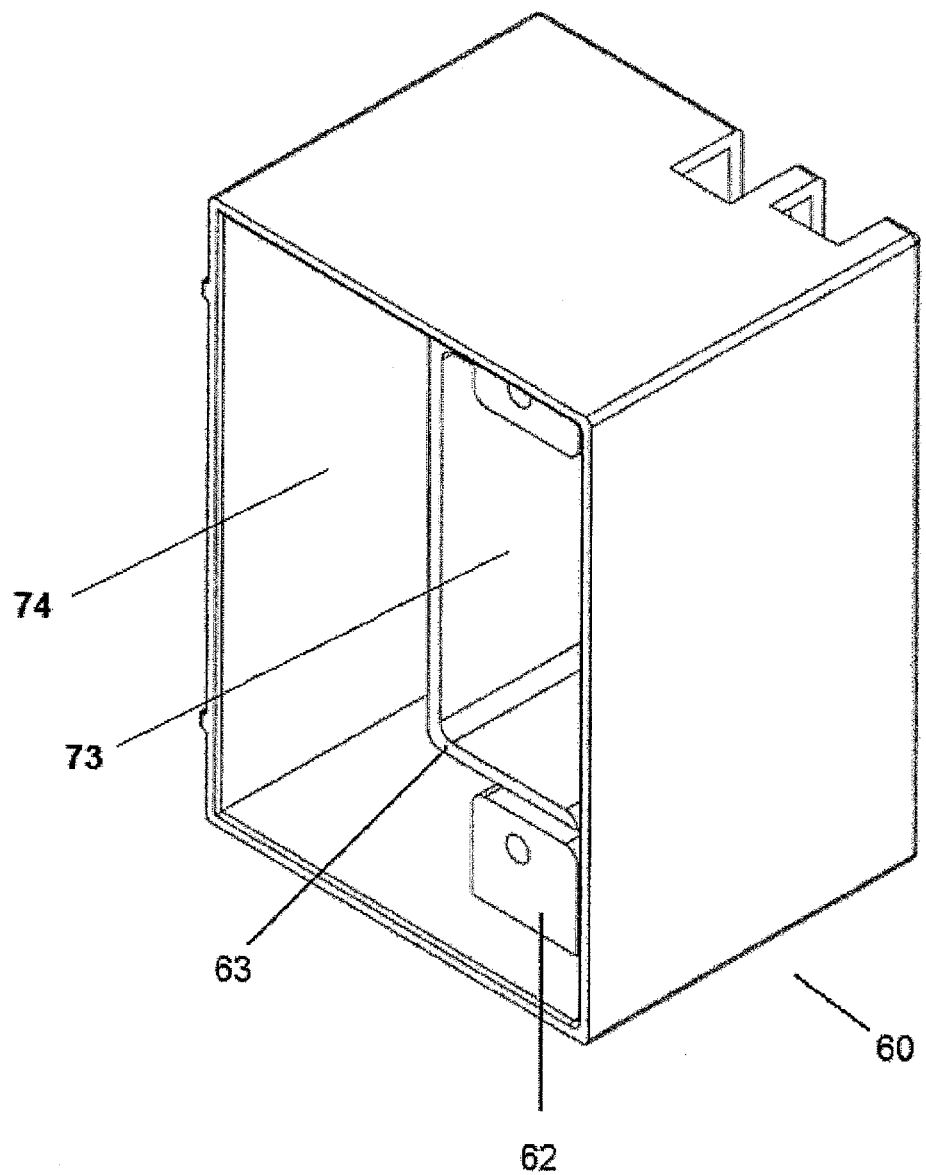
Figure 29:
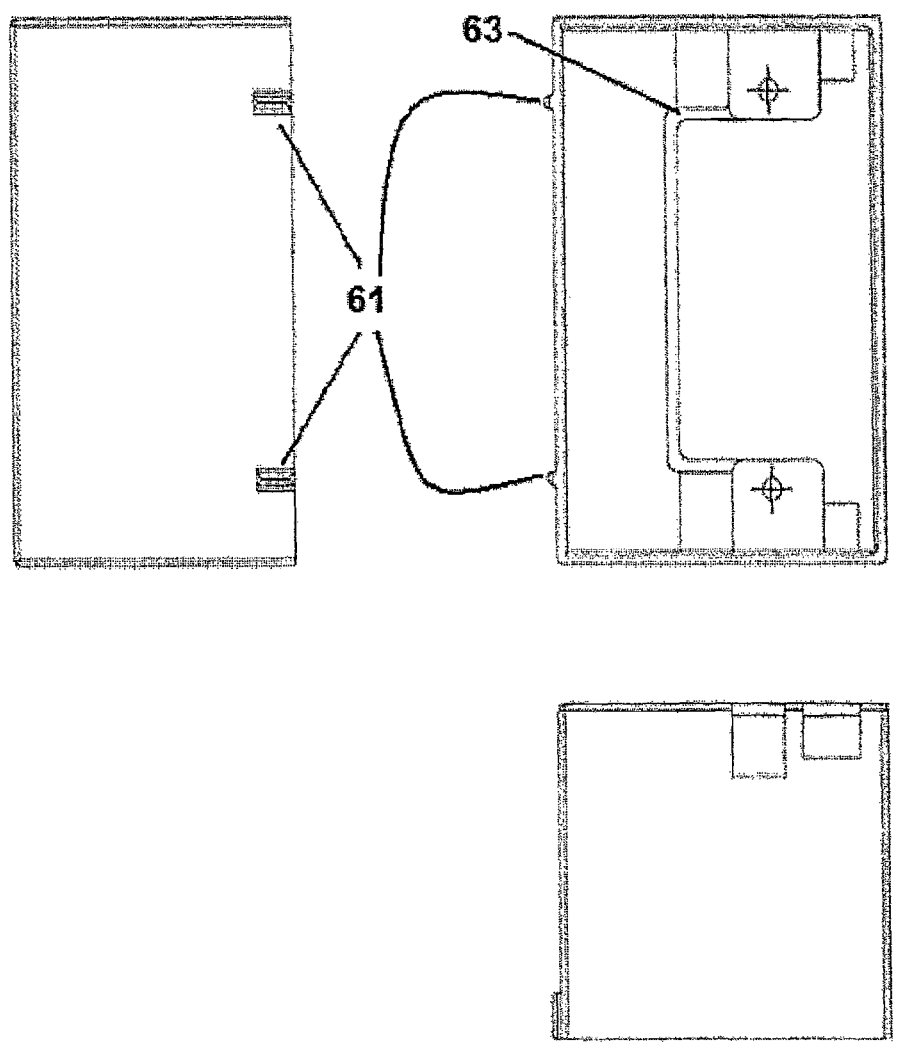
FIG. 29 is a schematic showing a front view, side view and a rear view of an electrical box of the present invention.
Figure 30:
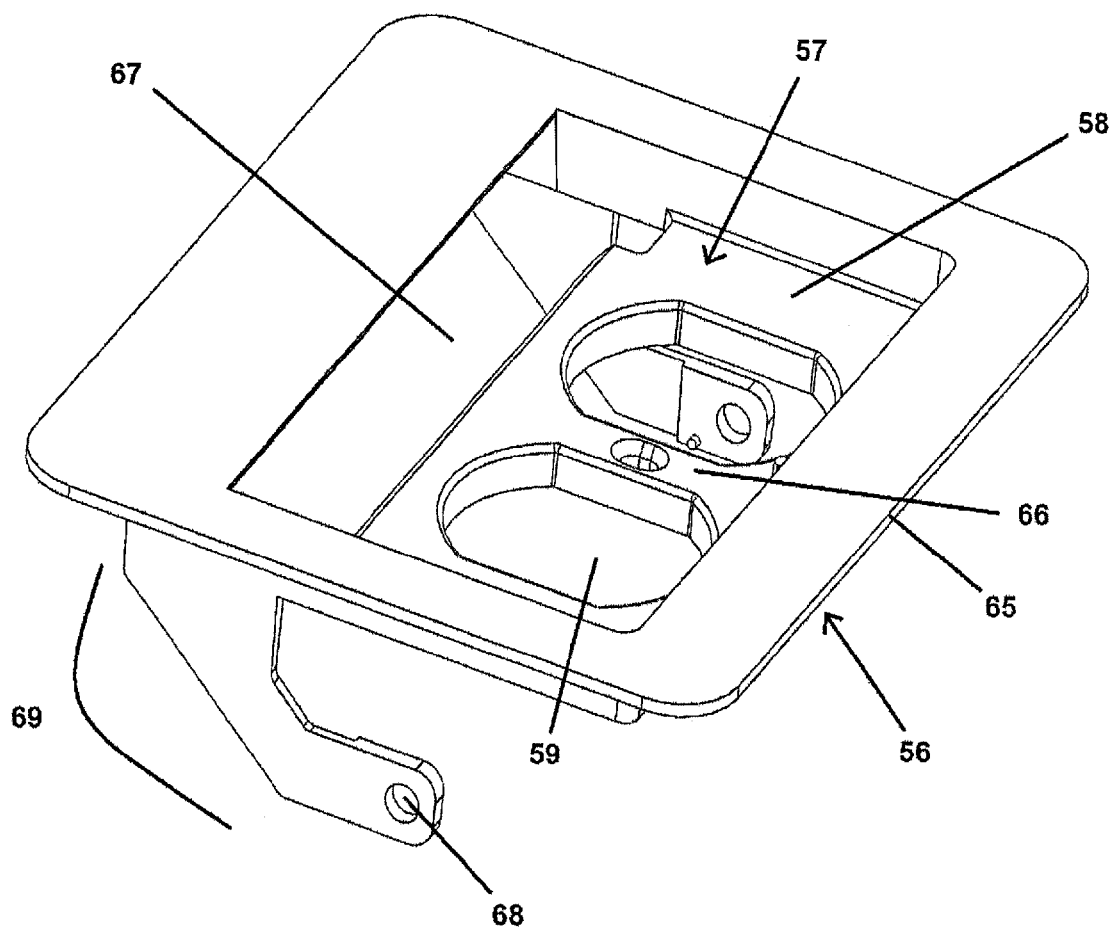
FIGS. 30 and 31 are views showing a flange of the present invention.
Figure 31:
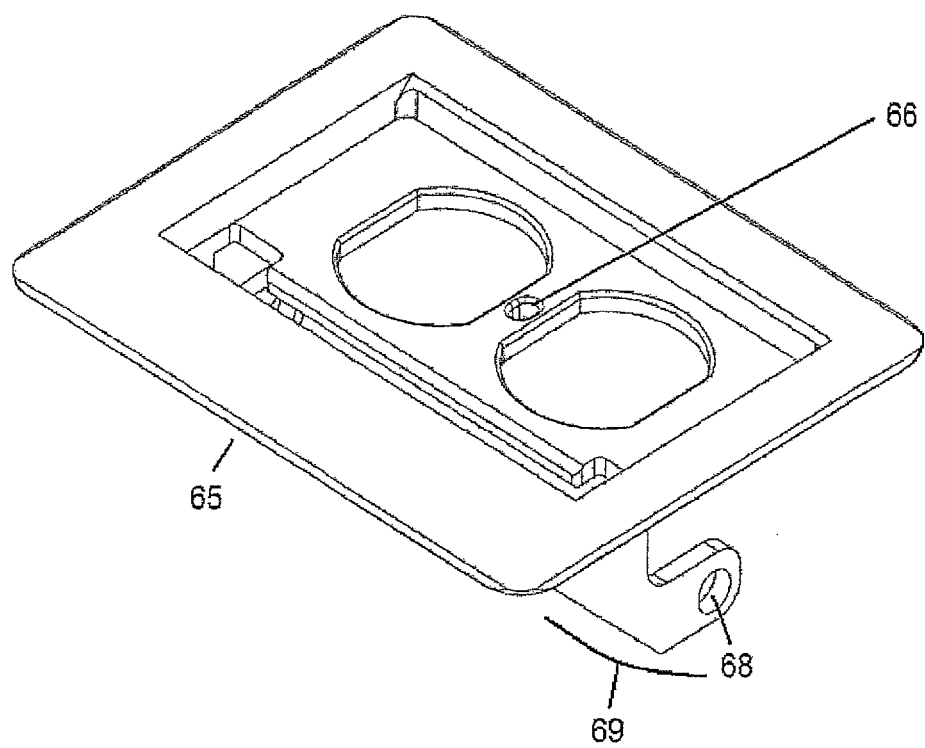
Figure 32:
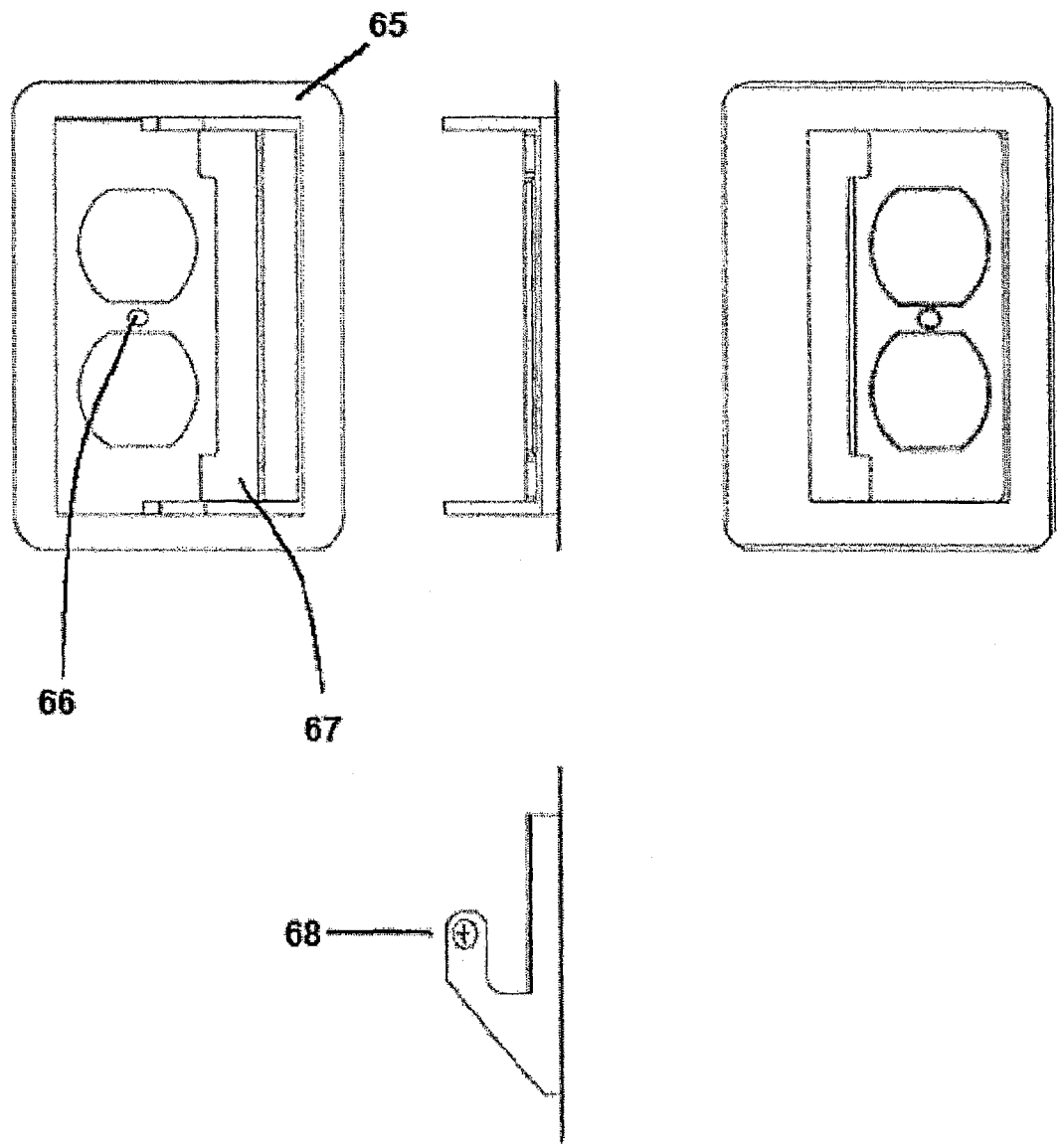
FIG. 32 is a schematic showing a front view, side views and a rear view of a flange of the present invention.

FIGS. 27-34 show a further embodiment of the present invention. In FIGS. 27 and 28, electrical box 60 is shown, which has been provided with mounting tabs 61 to allow the box to be installed or attached to a structure with minimized installation error (e.g., ensuring proper mounting depth). Furthermore, electrical box 60 is optimally shaped having dimensions to comply with code specifications requiring specific cubic volume, while concurrently limiting or minimizing the size of any drywall cut required to install the electrical box 60.

An electrical outlet may be mounted to screw holes tabs 62 such that the outlet is attached within electrical box 60. Specifically, screw hole tabs 62 are provided at a depth allowing an electrical outlet mounted such that an attached flange 65 (shown in FIGS. 30 and 31) intersects with electrical box 60 in a manner that avoids displacement of the flange 65 by such screws. For example, when an electrical outlet is mounted to screw hole tabs 62 with dome screws, the depth of screw hole tabs 62 is sufficient to allow intersection of the flange 65 and the electrical box 60 having a finished fit and avoids rocking of the flange 65.

Specifically, this embodiment as illustrated particularly in FIGS. 30-34 provides an electrical outlet cover configured to be mounted and attached to an electrical outlet. The electrical outlet cover comprises a main body 56 that includes front faceplate flange 65 defining a generally planar top cover surface peripherally extending around a central opening 57 therein and mounting plate 58 recessed inward from the generally planar top cover surface and located within the central opening. Mounting plate 58 includes a mounting mechanism (screw hole 66) configured to mount the mounting plate 58 to the electrical outlet. A first opening 59 is configured to expose at least a portion of the electrical outlet when mounted thereto and an elongated second opening 67 is offset from or adjacent to the first opening 59 as shown.

A door pivot support mechanism defines a pivot axis located inward of mounting plate 58 and includes a hinge receptor 68 and hinge portions 69. A door or cover 70 (FIGS. 33 and 34) is pivotally attachable to the door pivot support mechanism (68/69) to move through the elongated second opening 67 with rotational motion about the pivot axis defined by hinge receptor 68 between an open position and a closed position. In the open position, the first opening 59 is exposed and the door is located substantially inward of the top cover surface of the main body 56. In the closed position, the door covers the central opening 57 and a top surface of the door is substantially flush with the top cover surface of the main body 56.

Referring back to FIG. 28, electrical box 60 includes a first box cavity 73 capable of receiving the electrical outlet therein and a second box cavity 74 offset from and separated from the first cavity box 73 by a divider wall 63. Mounting structure (screw hole tabs 62) is configured to fixedly mount the electrical outlet in the first box cavity 73.

Figure 33:
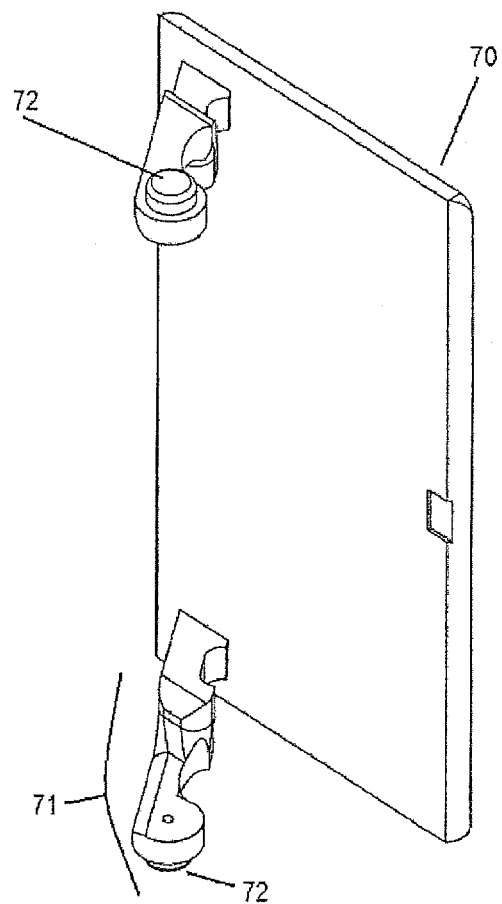
FIG. 33 is a view showing a door of the present invention.
Figure 34:
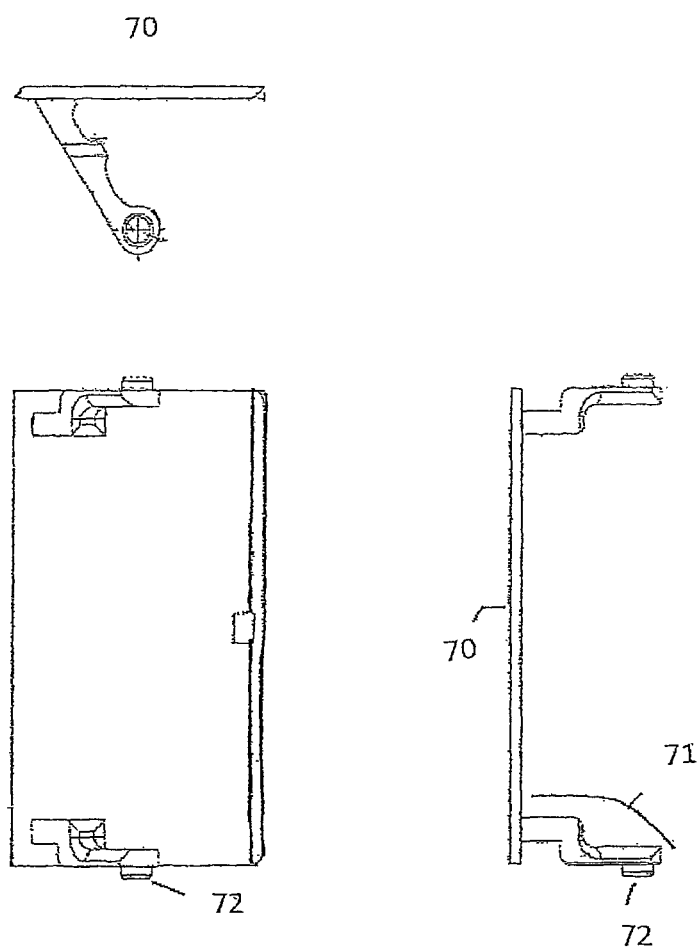
FIG. 34 is a schematic showing side views and a rear view of a door of the present invention.

Electrical box 60 (shown in FIGS. 27-28) also includes internal wall 63 (shown in FIGS. 27-29), provided to separate wires connected to an outlet terminal from interfering with the movement of door 70 (shown in FIG. 33). When an outlet is installed within electrical box 60, wiring connected to the outlet is constrained to an inner portion of internal wall 63. Accordingly, even when door 70 (shown in FIGS. 33 and 34) or flange 65 (shown in FIGS. 30 and 31) is removed from electrical box 60, a connected wiring would remain partitioned by inner wall 63, to avoid unintended contact with the connected wiring. For example, if a child were to remove either door 70 or flange 65 from electrical box 60, access to electrical connections would still be impeded by internal wall 63, according to this embodiment of the present invention.

With an electrical outlet attached to electrical box 60 at screw hole tabs 62, flange 65 is provided such that it can be attached the electrical outlet through screw hole 66. Door 70 can be attached to flange 65 by coupling hinge nodule 72 of door 70 to hinge receptor 68 of flange 65. When attached to flange 65, door 70 can traverse door opening 67, such that door 70 can be closed flush with flange 65 or alternatively retracted inside electrical box 60. Hence, both the flange 65 and door 70 are adapted to, yet removable from, electrical box 60. As such, the attachment mechanism of each part is configured to ensure a consistent relationship and finished fit, while also allowing easy maintenance or replacement of the individual parts, such as the flange 65 and the door 70.

Furthermore, by coupling the flange 65 with the door 70 at hinge portions 69 and 71, respectively, instead of edge portions, the interface of flange 65 and door 70 can be hidden within electrical box 60 by the bevel and reverse bevel of flange 65 and door 70, so as to create a satisfying aesthetic appearance. In addition, the hinge mechanism including hinge portions 69 and 71 is provided having a shape that allows the hinge to rotate, yet intersect the flange at a relatively flat angle (that is, less than 90°). Accordingly, door 70 may be opened and closed with minimal required clearance, such that an electrical outlet installed within electrical box 60 may be safely and easily accessed, for example, behind furniture and other objects that are situated in front of the outlet, which embodiments 2 and 3 do not provide.

A flange 65 according to this embodiment can be manufactured using "Finite Element Analysis" manufacturing techniques, which are known in the art and not described herein, to allow production of flange 65 with extremely thin, yet durable, material. A flange 65 produced in this manner will allow extreme tapering of the flange's intersection with surrounding drywall (or other adjoining surface).

Furthermore, a flange 65 and/or a door 70 of this embodiment can be provided with opening/closing mechanisms including, for example, a kinematic push/pull opening mechanism or a spring assisted door, that facilitate the operation of the door. Such opening/closing mechanism allows the user access by pushing lightly on the hinge side of the door and have it open fully, allowing one-handed access by a user with an electrical chord in hand, which embodiments 2 and 3 do not provide. It also can enhance the safety features of the present invention, for example, by mechanically shutting a door 70 that is only partially opened and reducing the risk that door 70 is inadvertently opened or left open.

This embodiment of the present invention therefore achieves additional safety and aesthetic advantages by integrating an electrical box, flange and door, such that the door is easily accepted into the flange and inside the electrical box with minimal interference from within the electrical box or by the attachment mechanism and minimal clearance required outside of the electrical box.

Each embodiment of the present invention described above can be further adapted and implemented in a variety of different combinations with modifications readily understood by those of ordinary skill in the art. Therefore, the scope of the present invention is intended to be comprehended in accordance with the general knowledge of the art and should not be construed to be limited solely to the above described embodiments.

The invention claimed is:

1. An electrical outlet cover, comprising:
a main body including:
a front faceplate flange defining a generally planar top cover surface peripherally extending around a central opening therein;
a mounting plate recessed inward from the generally planar top cover surface and located within the central opening, the mounting plate including:
a mounting mechanism configured to mount the mounting plate to an electrical outlet; and
a first opening configured to expose at least a portion of the electrical outlet when mounted thereto;
an elongated second opening offset from or adjacent to the first opening; and
a door pivot support mechanism defining a pivot axis located inward of the front faceplate flange at a distance from the plane of the front faceplate flange; and
a door pivotally attachable to the door pivot support mechanism by hinge portions to move through the elongated second opening with only rotational motion about the pivot axis between an open position and a closed position,
wherein in the open position, the first opening is exposed and the door is located almost entirely inward of the top cover surface of the main body,
wherein in the closed position, the door covers the central opening and a top surface of the door is flat and substantially flush with the top cover surface of the main body,
wherein the second opening is configured to accommodate the rotational motion of the door and hinge portions about the pivot axis between the open position and the closed position,
wherein the pivot axis is located along a vertical plane at substantially the center of the central opening taken parallel to the leading edge of the door in the front faceplate flange, and
wherein the door is configured to be manually movable from the closed position by pushing on the door at a location between the pivot axis and the second opening.

2. The electrical outlet cover according to claim 1, wherein all lateral sides of the door are entirely hidden from view by sides of the front faceplate flange when the door is in the closed position to provide a clean, visual appearance of a wall.

3. The electrical outlet cover according to claim 1, wherein the electrical outlet cover is configured to be directly mounted to the electrical outlet.

4. The electrical outlet cover according to claim 1, wherein the second opening is C-shaped to accommodate rotation of the door and the hinge portions.

5. The electrical outlet cover according to claim 1, wherein structure necessary to achieve the rotational motion of the door about the pivot axis between the closed position and the open position upon said pushing on said door consists of one of the door and the door pivot support mechanism having a hinge receptor at the pivot axis and the other having a hinge nodule at the pivot axis.

6. An electrical box assembly comprising:
an electrical box configured to attach to a wall, ceiling or floor, the electrical box including:
a first box cavity;
a mounting structure configured to fixedly mount an electrical outlet in the first box cavity; and
a second box cavity offset from and separated from the first box cavity by a divider wall; and
an electrical outlet cover configured to be mounted and attached to the electrical box, the electrical outlet cover comprising:
a main body including:
a front faceplate flange defining a generally planar top cover surface peripherally extending around a central opening therein;
a mounting plate recessed inward from the generally planar top cover surface and located within the central opening, the mounting plate including:
a mounting mechanism configured to mount the mounting plate to the electrical box; and
a first opening configured to expose at least a portion of the electrical outlet when mounted thereto;
an elongated second opening offset from or adjacent to the first opening; and
a door pivot support mechanism defining a pivot axis located inward of the front faceplate flange at a distance from the plane of the front faceplate flange; and
a door pivotally attachable to the door pivot support mechanism by hinge portions to move through the elongated second opening with only rotational motion about the pivot axis between an open position and a closed position,
wherein when the electrical outlet cover is mounted to the electrical box, the first opening is configured to overlap with the first box cavity of the electrical box and the elongated second opening is configured to overlap with the second box cavity of the electrical box,
wherein in the open position, the first opening is exposed allowing access to the electrical outlet and the door is located almost entirely inward of the top cover surface of the main body within the second box cavity of the electrical box, wherein in the closed position, the door covers the central opening and a top surface of the door is flat and substantially flush with the top cover surface of the main body, wherein the second box cavity and the second opening are configured to accommodate the rotational motion of the door and hinge portions about the pivot axis between the open position and the closed position, wherein the pivot axis is located along a vertical plane at substantially the center of the central opening taken parallel to the leading edge of the door in the front faceplate flange, and wherein the door is configured to be manually movable from the closed position by pushing on the door at a location between the pivot axis and the second opening.

7. The electrical box assembly according to claim 6, wherein all lateral sides of the door are entirely hidden from view by sides of the front faceplate flange when the door is in the closed position to provide a clean, visual appearance of a wall.

8. The electrical box assembly according to claim 6, wherein the electrical outlet cover is configured to be directly mounted to the electrical outlet.

9. The electrical box assembly according to claim 8, wherein the mounting plate comprises a hole configured to accept a screw, the screw mounting the electrical outlet cover main body directly to the electrical outlet.

10. The electrical box assembly according to claim 6, wherein the second opening and the second box cavity are C-shaped to accommodate rotation of the door and the hinge portions.

11. The electrical outlet cover according to claim 6, wherein structure necessary to achieve the rotational motion of the door about the pivot axis between the closed position and the open position upon said pushing on said door consists of one of the door and the door pivot support mechanism having a hinge receptor at the pivot axis and the other having a hinge nodule at the pivot axis.

12. An electrical outlet cover, comprising:
a main body including:
a front faceplate flange defining a generally planar top cover surface peripherally extending around a central opening therein;
a mounting plate recessed inward from the generally planar top cover surface and located within the central opening, the mounting plate including:
a mounting mechanism configured to mount the mounting plate at least indirectly to an electrical box; and
a first opening configured to expose at least a portion of an electrical outlet when mounted thereto;
an elongated second opening offset from or adjacent to the first opening; and
a door pivot support mechanism, the door pivot support mechanism including a hinge receptor defining a pivot axis located inward of the front faceplate flange at a distance from the plane of the front faceplate flange; and
a hinged door including at least one hinge pivotally attachable to the hinge receptor of the door pivot support mechanism to move the hinged door through the elongated second opening with only rotational motion about the pivot axis between an open position and a closed position, wherein in the open position, the first opening is exposed and the door is located almost entirely inward of the top cover surface of the main body, wherein in the closed position, the door covers the central opening and a top surface of the door is flat and substantially flush with the top cover surface of the main body, wherein the second opening is configured to accommodate the rotational motion of the door and the at least one hinge about the pivot axis between the open position and the closed position, wherein the pivot axis is located along a vertical plane at substantially the center of the central opening taken parallel to the leading edge of the door in the front faceplate flange, and wherein the door is configured to be manually movable from the closed position by pushing on the door at a location between the pivot axis and the second opening.

13. The electrical outlet cover according to claim 12, wherein all lateral sides of the door are entirely hidden from view by sides of the front faceplate flange when the door is in the closed position to provide a clean, visual appearance of a wall.

14. The electrical outlet cover according to claim 13, wherein the electrical outlet cover is configured to be directly mounted to the electrical outlet in the electrical box.

15. The electrical outlet cover according to claim 14, wherein the mounting plate comprises a hole configured to accept a screw, the screw mounting the electrical outlet cover main body directly to the electrical outlet in the electrical box.

16. The electrical outlet cover according to claim 12, wherein the second opening is C-shaped to accommodate rotation of the door and the at least one hinge.

17. The electrical outlet cover according to claim 12, wherein structure necessary to achieve the rotational motion of the hinged door about the pivot axis between the closed position and the open position upon said pushing on said hinged door consists of the hinge receptor at the pivot axis and a hinge nodule of the at least one hinge of the hinged door at the pivot axis.

* * * * *